United States Patent
Scuderi et al.

(10) Patent No.: US 12,524,187 B2
(45) Date of Patent: Jan. 13, 2026

(54) DISPLAY PANEL

(71) Applicant: Osmosis Group Holdings Pty Ltd., Surry Hills (AU)

(72) Inventors: Will Scuderi, Surry Hills (AU); Gary Caldarola, Surry Hills (AU); Fabian Maritato, Surry Hills (AU); Chris Hook, Surry Hills (AU); John Phung, Surry Hills (AU); Jonathan Lo, Surry Hills (AU); Ahmed Ali, Surry Hills (AU); Emily Marcos, Surry Hills (AU)

(73) Assignee: OSMOSIS GROUP HOLDINGS PTY LTD., Surry Hills (AU)

( * ) Notice: Subject to any disclaimer, the term of this patent is extended or adjusted under 35 U.S.C. 154(b) by 0 days.

(21) Appl. No.: 18/695,773

(22) PCT Filed: Sep. 26, 2022

(86) PCT No.: PCT/AU2022/051151
§ 371 (c)(1),
(2) Date: Mar. 26, 2024

(87) PCT Pub. No.: WO2023/044544
PCT Pub. Date: Mar. 30, 2023

(65) Prior Publication Data
US 2024/0402842 A1 Dec. 5, 2024

(30) Foreign Application Priority Data

Sep. 27, 2021 (AU) .............................. 2021903094
Jan. 31, 2022 (AU) .............................. 2022900173

(51) Int. Cl.
*G06F 3/147* (2006.01)
*G06F 1/16* (2006.01)
(Continued)

(52) U.S. Cl.
CPC .......... *G06F 3/1454* (2013.01); *G06F 1/1643* (2013.01); *G06F 1/1647* (2013.01);
(Continued)

(58) Field of Classification Search
CPC ...... G06F 1/1643; G06F 1/1647; G06F 1/169; G06F 3/0412; G06F 3/0446;
(Continued)

(56) References Cited

U.S. PATENT DOCUMENTS 10,853,053 B1   12/2020   Gordon et al.
11,194,464 B1 * 12/2021   Flick .................... A63F 13/2145
(Continued)

FOREIGN PATENT DOCUMENTS

EP    2632188 B1 *  4/2018  ............ H04W 4/206

OTHER PUBLICATIONS

Barnett, Patrick. "Batman: Arkham City Armored Edition". Nintendo World Report (https://www.nintendoworldreport.com/preview/32341/batman-arkham-city-armored-edition-wii-u). Published Oct. 31, 2012 (printed May 21, 2025). (Year: 2012).*

*Primary Examiner* — Julie Anne Watko
(74) *Attorney, Agent, or Firm* — Snell & Wilmer LLP

(57) ABSTRACT

A touchscreen display system (1) for use with a host device (15) and configured to generate visual representations (5) as an output and to receive touch input (9) from a user. The touchscreen display system (1) comprises a graphical display (3) to generate (110) a visual representation (5); and a first communication interface (11) to receive (105) visual display output signals (13) from a host device (15). The touchscreen display system (1) also comprises: a touch panel sensor (7) at the graphical display (3) to receive a touch input (9) of a user (10); and at least one processor (16) configured to: determine (120) one or more locations of the touch input (9) relative to the graphical display (3); and
(Continued)

generate (130) pointing device input signals (19) based on the one or more locations of the touch input (9). A second communication interface (17) sends (135) the pointing device input signals (19) to the host device (15), where the first communication interface (11) is separate to the second communication interface (17).

15 Claims, 12 Drawing Sheets

(51) Int. Cl.
  *G06F 1/3218* (2019.01)
  *G06F 3/041* (2006.01)
  *G06F 3/0488* (2022.01)
  *G06F 3/04883* (2022.01)
  *G06F 3/14* (2006.01)
(52) U.S. Cl.
  CPC ............ *G06F 1/169* (2013.01); *G06F 3/0412* (2013.01); *G06F 3/04883* (2013.01); *G06F 3/0488* (2013.01); *G06F 2200/1614* (2013.01); *G09G 2370/02* (2013.01); *G09G 2370/16* (2013.01)

(58) Field of Classification Search
  CPC .. G06F 3/0488; G06F 3/04883; G06F 3/1454; G06F 2200/1612; G06F 2200/1614; G06F 3/32; G06F 3/3208; G06F 2370/02; G06F 2370/16; G09G 3/32; G09G 3/3208; G09G 2370/02; G09G 2370/16
  See application file for complete search history.

(56) References Cited

U.S. PATENT DOCUMENTS

| | | |
|---|---|---|
| 2015/0012831 A1* | 1/2015 | Boggess ............... G06F 3/1454 715/733 |
| 2015/0324109 A1 | 11/2015 | Lee et al. |
| 2016/0224238 A1 | 8/2016 | Rothkopf |
| 2017/0131963 A1 | 5/2017 | Stahl et al. |
| 2017/0351472 A1* | 12/2017 | Passeri ................ G06F 3/04812 |
| 2018/0070389 A1 | 3/2018 | Morgan |
| 2019/0346885 A1 | 11/2019 | Sepulveda et al. |
| 2021/0286450 A1* | 9/2021 | Han ..................... G06F 3/0383 |

* cited by examiner

DISPLAY PANEL

TECHNICAL FIELD

The present disclosure relates to a touchscreen display system for use with a host device.

BACKGROUND

With advances in computer technology, there has been a trend from using desktop computers to portable computers (such as laptop computer, notebook computers, tablet computers, and hybrids and variations thereof). This trend has facilitated a physically mobile workforce, where workers may work in various locations throughout a work day or work week. For example, working from a home office, to a share space, to an office with hot desking arrangements, etc.

However portable computers have a trade-off between portability versus screen size and some portable computers can be connected to an additional monitor to increase screen size. Furthermore, multiple screens can increase productivity of a user.

To further increase productivity human interface devices (such as a wireless mouse) may be added to supplement human interface devices (HID) that are integral to the portable computer.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

In some operating systems and computers, a monitor (and associated display output) is distinctly separate to a pointing input device (such as a mouse or keyboard). There are touchscreen displays, that combine both functions, namely: (i) display a visual representation to the user; and (ii) receives an input from the user. However, these often require specialised operating systems and protocols to enable simultaneous input and output.

For computers and operating systems that do not natively support touchscreen displays, it may be difficult or impossible to fully utilise the features of the touchscreen. Some computers may achieve partial functionality—i.e. the computer can use the touchscreen as a display, but not as an effective touch input device. For example, some tablet devices can be used as an additional display for another computer (that functions as a host device), but touchscreen functionality of the tablet device cannot be used as a human interface device (HID for the host device. Other problems may include, for example ineffective or misalignment between what is displayed on the monitor and the determined location of a touch input from the user. Aspects of the present disclosure are directed to a touchscreen display system to be used by a computer and associated operating system that may not have native support for touchscreens at the operating system level.

In one aspect, there is disclosed a touchscreen display system comprising: a graphical display to generate a visual representation; and a touch panel sensor at the graphical display to receive a touch input of a user and, in response, generate tough data input signals. The touchscreen display system also includes at least one processor, a first communication interface, and a second communication interface. The first communication interface is configured to receive visual display output signals from the host device, wherein the visual representation at the graphical display is based on the visual display output signals. The at least one processor is configured to: determine, based on the touch data input signals, one or more locations of the touch input relative to the display; and generate pointing device input signals based on the one or more locations of the touch input. The second communication interface is configured to send the pointing device input signals to the host device. The first communication interface is separate to the second communication interface.

In some examples, this separation can include different physical communication channels. Advantageously, with communication to the host by different communication means for visual display and touch input, this enables the touchscreen display system to interface and work with a host device that supports visual display and pointing devices. Therefore examples of the touchscreen display system can emulate a fully supported touchscreen on a host device that does not have touchscreen support at operating system level. The touchscreen display may provide a user experience that is the same, better, or at least comparable, to use of a touchscreen on a host device with an operating system that supports touchscreen.

There is disclosed a touchscreen display system comprising: a graphical display to generate a visual representation; a touch panel sensor; at least one processor; a first communication interface; and a second communication interface. The first communication interface is configured to receive visual display output signals from a host device, wherein the visual representation at the graphical display is based on the visual display output signals. The touch panel sensor at the graphical display is configured to receive a touch input of a user and, in response, generate touch data input signals. The at least one processor is configured to: determine, based on the touch data input signals, one or more locations of the touch input relative to the graphical display; and generate pointing device input signals based on the one or more locations of the touch input. The second communication interface is configured to send the pointing device input signals to the host device, wherein the first communication interface is separate to the second communication interface.

In some examples, to generate pointing device input signals further comprises: scaling or mapping the one or more locations of the touch input to corresponding locations at the generated visual representation.

In some examples, the pointing device input signal includes at least a cursor location.

In some examples, the pointing device input signal further comprises: one or more click input; and/or one or more gesture inputs.

In some examples, the pointing device input signal further comprises, in a first mode: an active screen control notification, wherein the active screen control notification is indicative of an active touch input of the user at the touch panel sensor. The active screen control notification received at the host device enables switching to a cursor location to a corresponding location at the generated visual representation.

In some examples, wherein in the absence of an active touch input at the touch panel sensor, the pointing device input signal further comprises, in a second mode: an inactive screen notification; or an absence of the active screen notification. In response to the inactive screen notification, or the absence of the active screen notification received at the host device, enables switching to an alternative pointing device of the host device.

In further examples, the inactive screen notification, or absence of the active screen notification, enables the host device to switch the alternative pointing device of the host device to a preceding cursor location at a preceding window.

In some examples, the at least one processor is further configured to: determine based on the touch data input signals, or the one or more locations of the touch input, a palm location of the touch input that correspond to palm contact of a user with the touch panel sensor, wherein to generate pointing device input signals is based on the one or more locations of the touch input without the determined palm location.

In some examples, the touch panel sensor is a capacitive sensor.

In some examples, the first communication interface communicates with the host device wirelessly via WiFi®.

In some examples, the first communication interface communicates with the host device via wired communication.

In some examples, the second communication interface communicates with the host device wirelessly via Bluetooth®.

In some examples, the touchscreen display system further comprises: one or more accelerometers to provide accelerometer output signals, wherein an accelerometer data, based on the accelerometer output signals, is sent to the host device, via the first communication interface and/or the second communication interface.

In some examples, the touchscreen display system further comprises: one or more accelerometers to provide accelerometer output signals, wherein the at least one processor is configured to: determine an orientation of the graphical display based on the accelerometer output signals, generate an orientation output signal based on the determined orientation, wherein the orientation output signal is sent to the host device, via the first communication interface and/or the second communication interface.

In some examples, of the touchscreen display system, wherein to generate pointing device input signals is further based on the accelerometer output signals or determined orientation of the graphical display.

In some examples, the at least one processor is further configured to: determine, based on the touch data input signals, one or more gestures; and generate additional human interface device (HID) signals based on the gestures; wherein the second communication interface is further configured to send the additional HID signals to the host device.

In some examples, the at least one processor is further configured to: determine, based on sensed voltage at the touch panel sensor, whether the touch input is from contact by a digit of a user or a stylus, wherein the pointing device input signals further includes an indication of contact by a digit or stylus.

There is also disclosed a computer-implemented method performed by at least one processor at a touchscreen display system, the method comprising: generating a visual representation at a graphical display based on visual display output signals received from via a first communication interface; determining based on touch data input signals from a touch panel sensor, one or more locations of a touch input from a user relative to the graphical display; generating pointing device input signals based on the one or more locations of the touch input; and sending the pointing device input signals to the host device via the second communication interface, wherein the first communication interface is separate to the second communication interface.

In some examples of the method, generating pointing device input signals further comprises: scaling or mapping the one or more locations of the touch input to corresponding location at the generated visual representation.

In some examples, the method further comprises: determining based on the touch data input signals, or the one or more locations of the touch input, a palm location of the touch input that correspond to palm contact of a user with the touch panel sensor, wherein generating pointing device input signals is based on the one or more locations of the touch input without the determined palm location.

In some examples of the method, the touchscreen display system has one or more accelerometers to provide accelerometer output signals, and the method further comprises: sending accelerometer data, based on accelerometer output signals, to the host device via the first communication interface and/or the second communication interface.

In some examples of the method, the touchscreen display system has one or more accelerometers to provide accelerometer output signals, and the method further comprises: determining an orientation of the graphical display based on the accelerometer output signals; generating an orientation output signal based on the determined orientation; sending the orientation output signal to the host device via the first communication interface and/or the second communication interface.

In some examples of the method, wherein generating pointing device input signals is further based on the accelerometer output signals or determined orientation of the graphical display.

In some examples, the method further comprises: determining, based on the touch data input signals, one or more gestures; generating additional human interface device (HID) signals based on the gestures; sending the additional HID signals to the host device via the second communication interface.

In some examples, the method further comprises: determining, based on sensed voltage at the touch panel sensor, whether the touch input is from contact by a digit of a user or a stylus, and wherein the pointing device input signals further includes an indication of contact by a digit or stylus.

There is also disclosed a computer-implemented method performed by at least one processor at a host device, the method comprising: sending, to a touchscreen display system, visual display output signals for generating a visual representation at a graphical display; sending, to an alternate graphical display, alternate visual display output signals for generating an alternate visual representation at the alternate graphical display; receiving, from an alternative pointing device of the host device, an alternative pointing device input signal, wherein the alternative pointing device input signal includes at least a preceding cursor location associated with the visual representation, or alternative visual representation; receiving, from a touchscreen display system, a pointing device input signal, wherein the pointing device input signal comprises: in a first mode, an active screen control notification and at least a cursor location, wherein the active screen control notification is indicative of an active touch input of the user at a touch panel sensor of the touchscreen display system, and wherein in response to the active screen control notification, the method includes switching the cursor location to a corresponding location at the generated visual representation displayed on the graphical display.

In some examples of the method, the pointing device input signal further comprises, in a second mode: an inactive screen notification; or an absence of the active screen notification, wherein in response to the inactive screen notification, or the absence of the active screen notification, the method includes reverting to receiving alternative pointing device input signals from the alternative pointing device.

In some examples of the method, wherein in response to the inactive screen notification, or the absence of the active screen notification, the method further includes reverting to the preceding cursor location associated with the visual representation, or alternative visual representation.

In some examples, the method further comprises: receiving, from the touchscreen display system, additional human interface device (HID) signals; querying a library to determine one or more macros corresponding to the additional HID signals; and executing the determined one or more macros.

There is also disclosed a computer-implemented method performed by at least one processor at a host device, the method comprising: receiving, from a touchscreen display system, accelerometer data from the touchscreen display system; determining an orientation of a graphical display of the touchscreen display system based on the accelerometer data; configuring a display orientation and/or display resolution for visual display output signals based on the determined orientation; and sending, to the touchscreen display system, visual display output signals for generating a visual representation at the graphical display.

There is also disclosed a computer-implemented method performed by at least one processor at a host device, the method comprising: receiving, from a touchscreen display system, an orientation output signal from the touchscreen display system, wherein the orientation output signal is indicative of an orientation of a graphical display of the touchscreen display system; configuring a display orientation and/or display resolution for visual display output signals based on the received orientation; and sending, to the touchscreen display system, visual display output signals for generating a visual representation at the graphical display.

In some examples, the method further comprises: configuring a boundary for a pointing device based on the display orientation and/or display resolution.

In some examples, the method further comprises: receiving pointing device input signals from the touchscreen display system, wherein the pointing device input signals include one or more gesture inputs; determining based on the pointing device input signals one or more gestures; querying a library to determine one or more macros corresponding to the one or more gestures; and executing the determined one or more macros.

In some examples, the method further comprises: determining the relative position of the graphical display relative to the alternate graphical display; wherein in response to the active screen notification, the switching of the cursor location to a corresponding location at the generated visual representation displayed on the graphical display includes applying an offset based on the relative position of the graphical display.

There is also disclosed a computer-implemented method performed by at least one processor at a host device, the method comprising: sending, to a touchscreen display system, first visual display output signals for generating a first visual representation at a first graphical display and second visual display output signals for generating a second visual representation at a second graphical display; receiving, from the touchscreen display system, a first pointing device input signal, wherein the first pointing device input signal comprises a first active screen control notification and at least a first cursor location, wherein the first active screen control notification is indicative of an active touch input of the user at a first touch panel sensor associated with the first graphical display. In response to the first active screen control notification, the method includes: determining the relative location of the corresponding first graphical display to the second graphical display and/or other graphical display; and switching the cursor location to a corresponding location at the generated first visual representation displayed on the first graphical display, wherein switching to the corresponding location includes applying an offset based on the relative position of the first graphical display.

In some examples, the method further comprises: receiving, from the touchscreen display system, a second pointing device input signal, wherein the second pointing device input signal comprises a second active screen control notification and at least a second cursor location, wherein the second active screen control notification is indicative of an active touch input of the user at a second touch panel sensor associated with the second graphical display. In response to the second active screen control notification, the method includes: determining the relative location of the corresponding second graphical display to the first graphical display and/or other graphical display; and switching the cursor location to a corresponding location at the generated second visual representation displayed on the second graphical display, wherein switching to the corresponding location includes applying an offset based on the relative position of the second graphical display.

DESCRIPTION OF EMBODIMENTS

Overview

Figure 1:
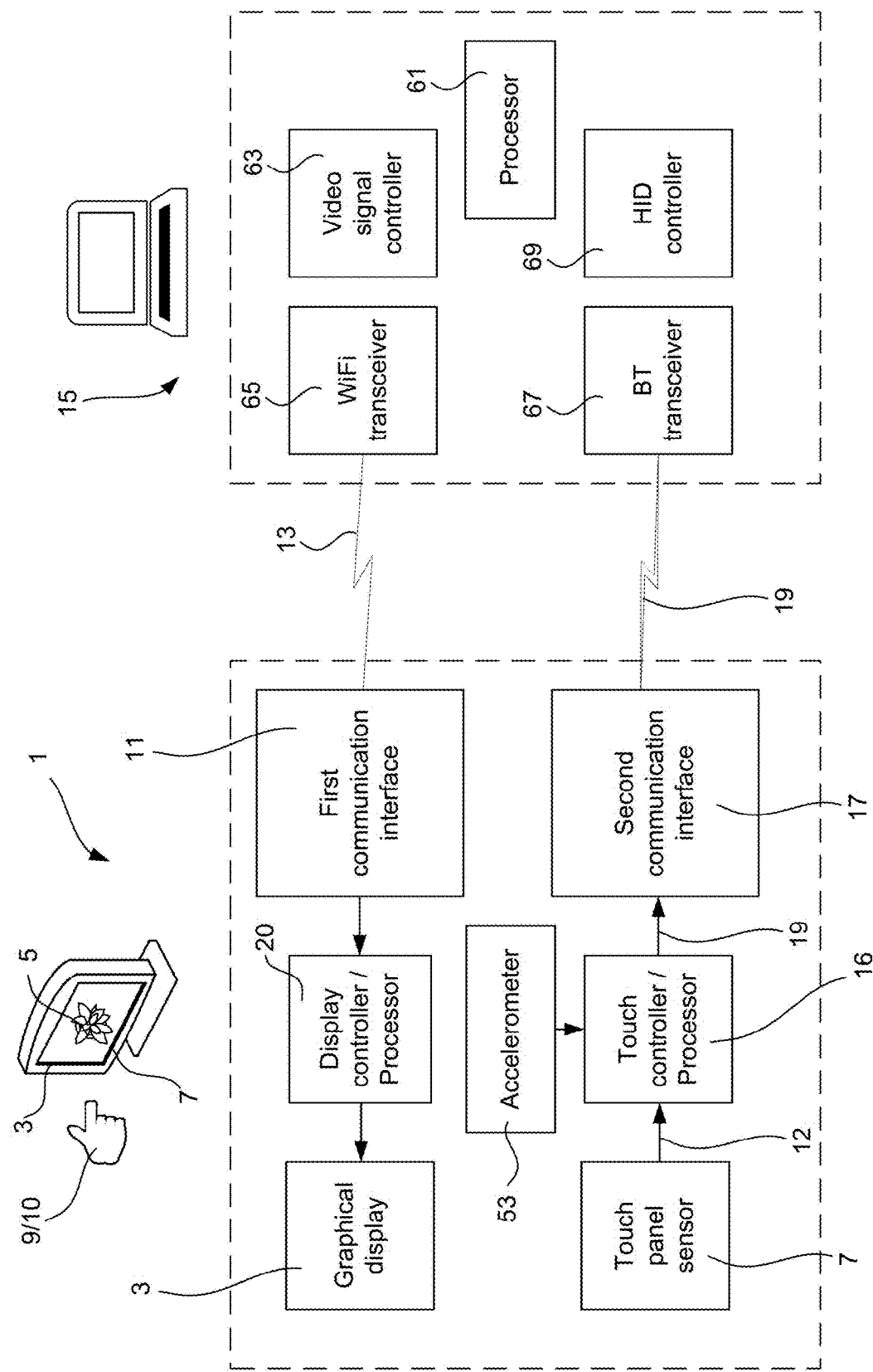
FIG. 1 is a schematic of a touchscreen display system and a host device.
Figure 2:
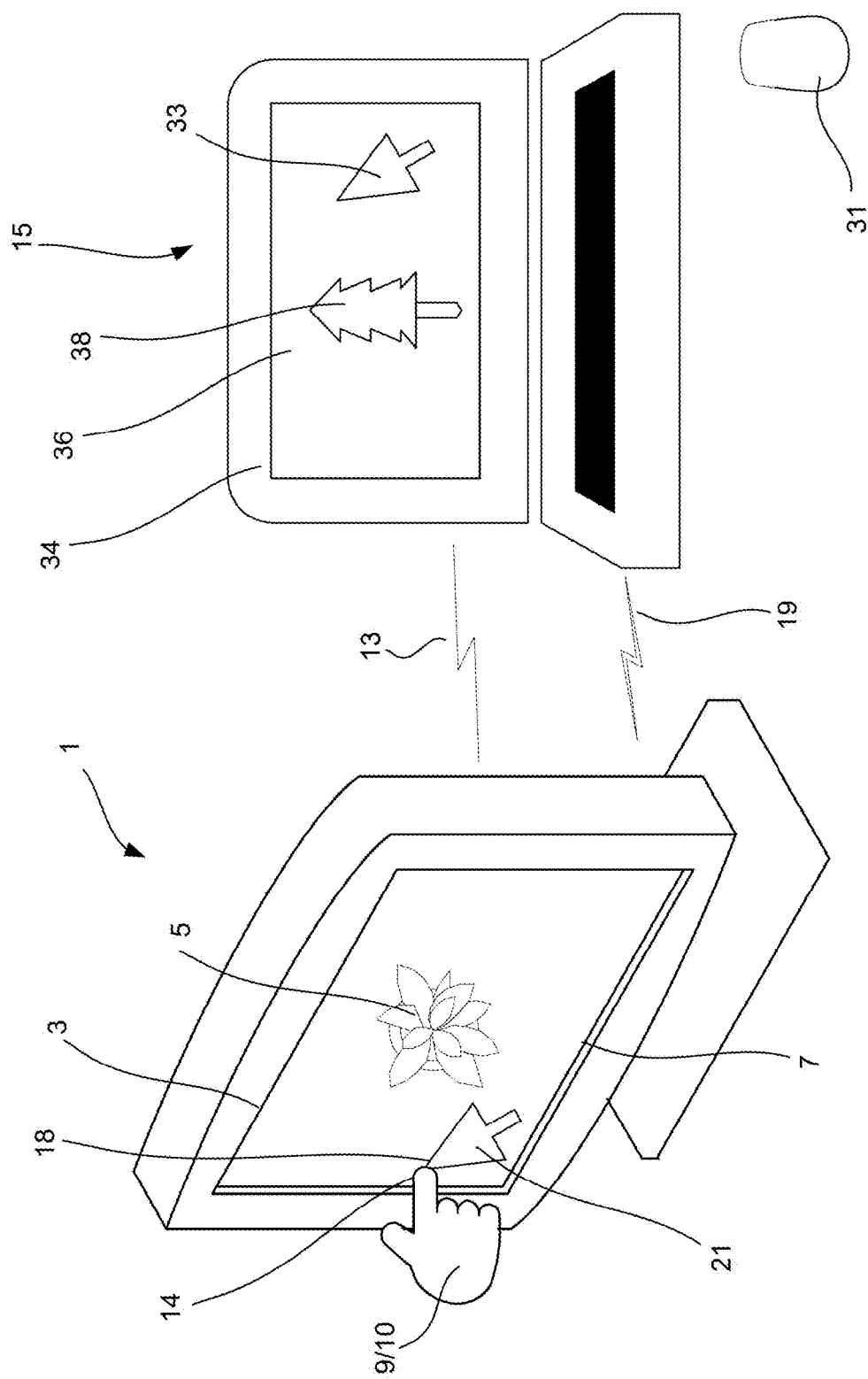
FIG. 2 is an another view of a touchscreen display system and a host device receiving a touch input from a user.

A touchscreen display system 1 according to a first example is illustrated in FIGS. 1 and 2. The touchscreen display system 1 can be used with a host device 15, wherein the touchscreen display system 1 functions as a visual display output and a human interface device (HID) input for the host device 15.

The touchscreen display system 1 includes a first communication interface 11 to receive visual display output signals 13 from the host device 15 and a graphical display 3 to generate a visual representation 5. The visual representation 5 is based on the received visual display output signals 13.

The touchscreen display system 1 also includes a touch panel sensor 7 at the graphical display 3 to receive a touch input of a user 10 and, in response, generate 115 touch data input signals 12. The touchscreen display system 1 also includes at least one processor configured to: determine 120, based on the touch data input signals 12, one or more locations of the touch input 9 relative to the graphical display 3; and generate 130 pointing device input signals 19 based on the one or more locations of the touch input 9.

The touchscreen display system 1 also includes a second communication interface 17 to send 135 the pointing device input signals 18 to the host device 15. As illustrated in FIG. 1, the first communication interface 11 is separate to the second communication interface 17.

The separate communication interfaces 11, 17 may be advantageous in a host device 15 that has separate communication means for sending visual display output signals and receiving pointing device (or other HID) input signals. For example, the visual display output may be transmitted by Wi-Fi®, USB-C®, HDMI®, mini DisplayPort™ communication means and protocols. On the other hand, the pointing device input signals may be transmitted by Bluetooth® HID protocols. This can enable an effective touchscreen display system for host devices 15 that do not have native touchscreen support.

Further examples of the touchscreen display system 1 will be described below, including additional functionality. This includes scaling so that a touch input is properly scaled to the visual representation, rejection of unwanted palm input, adjusting settings when the display is rotated, changing the active screen to the touchscreen display system when a touch input is received.

Figure 5:
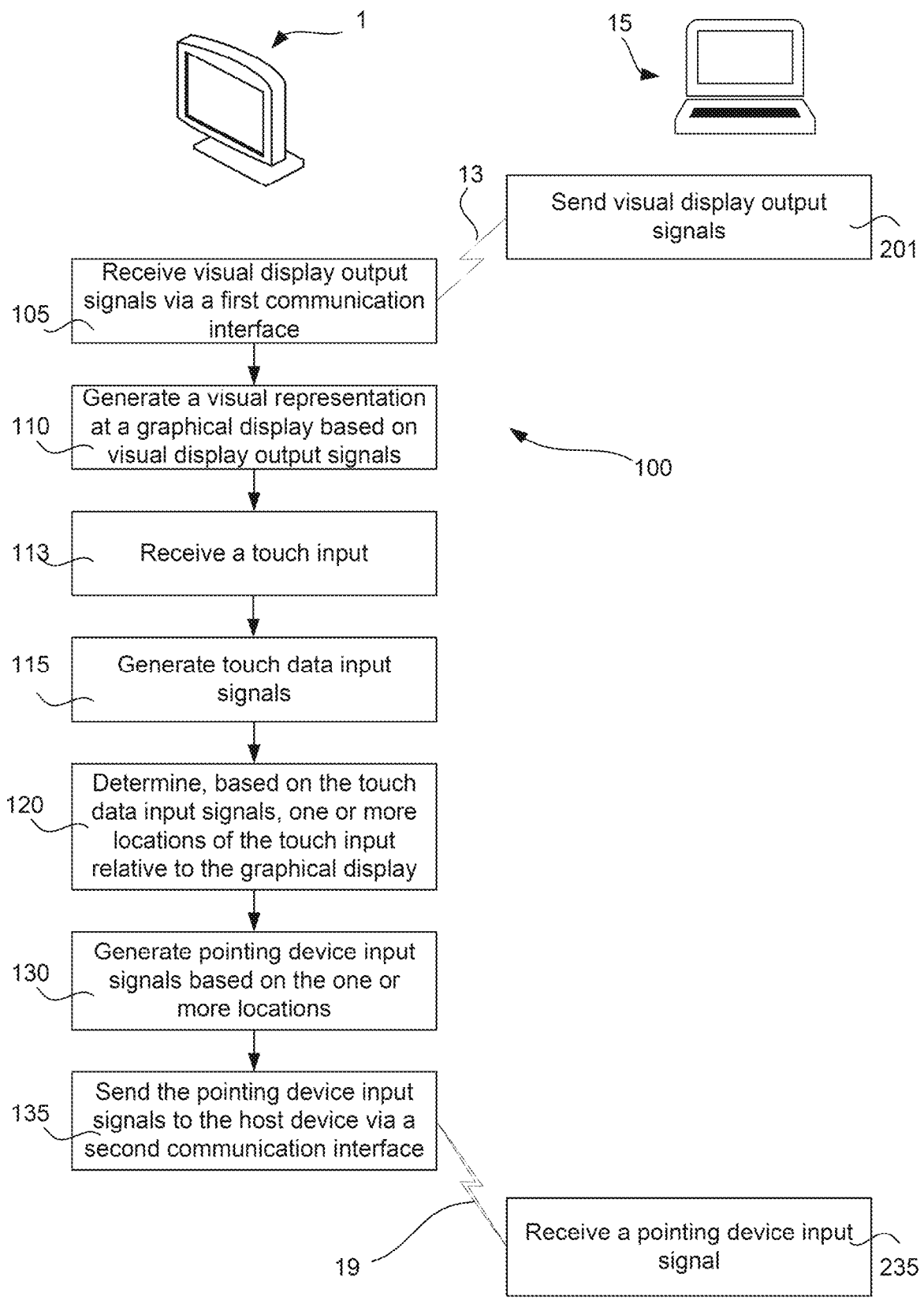
FIG. 5 is a flow diagram of a method of the touchscreen displaying a visual representation and receiving touch inputs for use with a host device.

In addition, the present disclosure also includes a computer-implemented method 100 performed by the touchscreen display system 1 as illustrated in FIG. 5, which is typically performed by the at least one processor 16 of the touchscreen display system 1.

Figure 8:
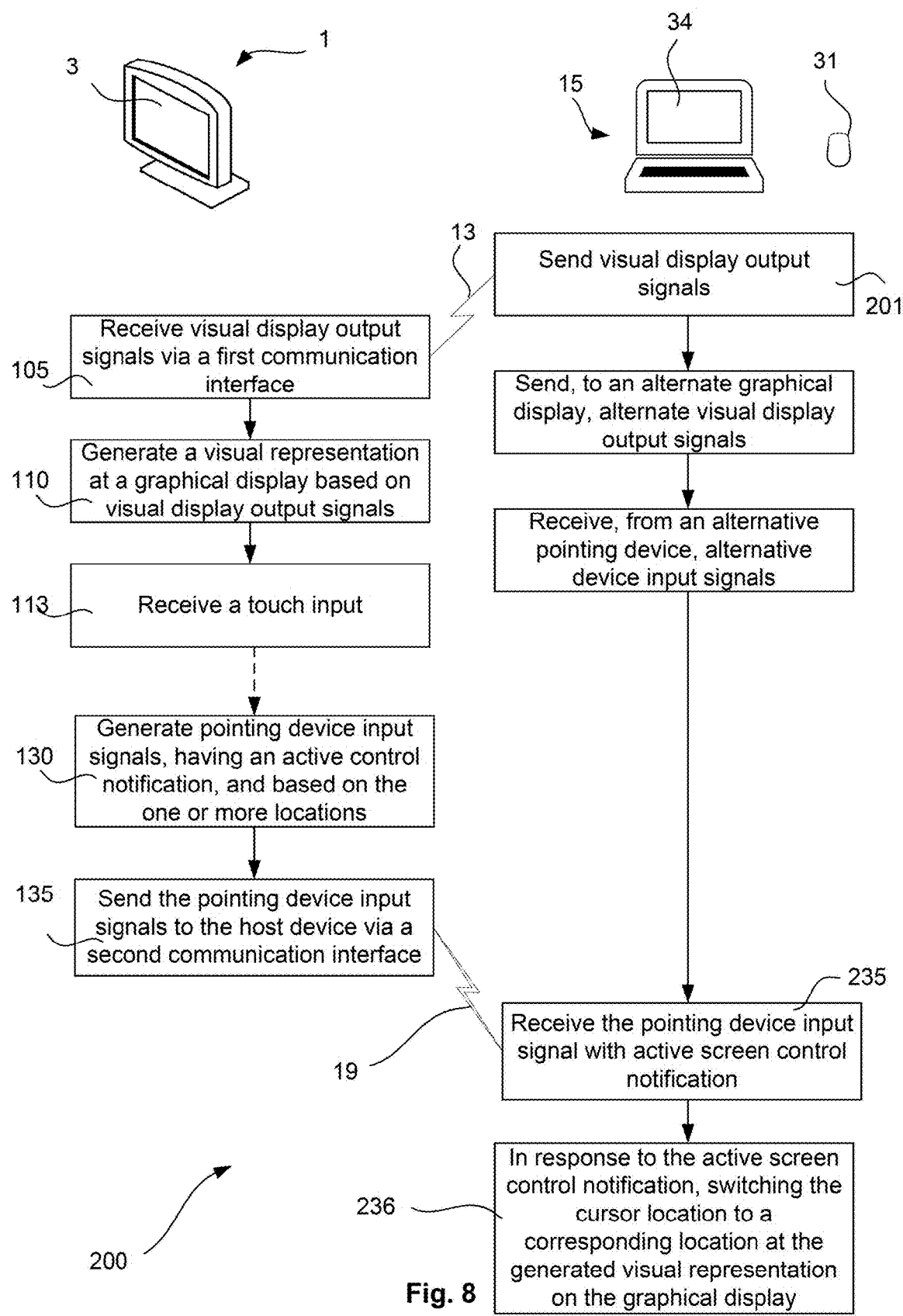
FIG. 8 is a flow diagram of a method of switching between the touch panel sensor to receive a touch input and an alternative pointing device.
Figure 11:
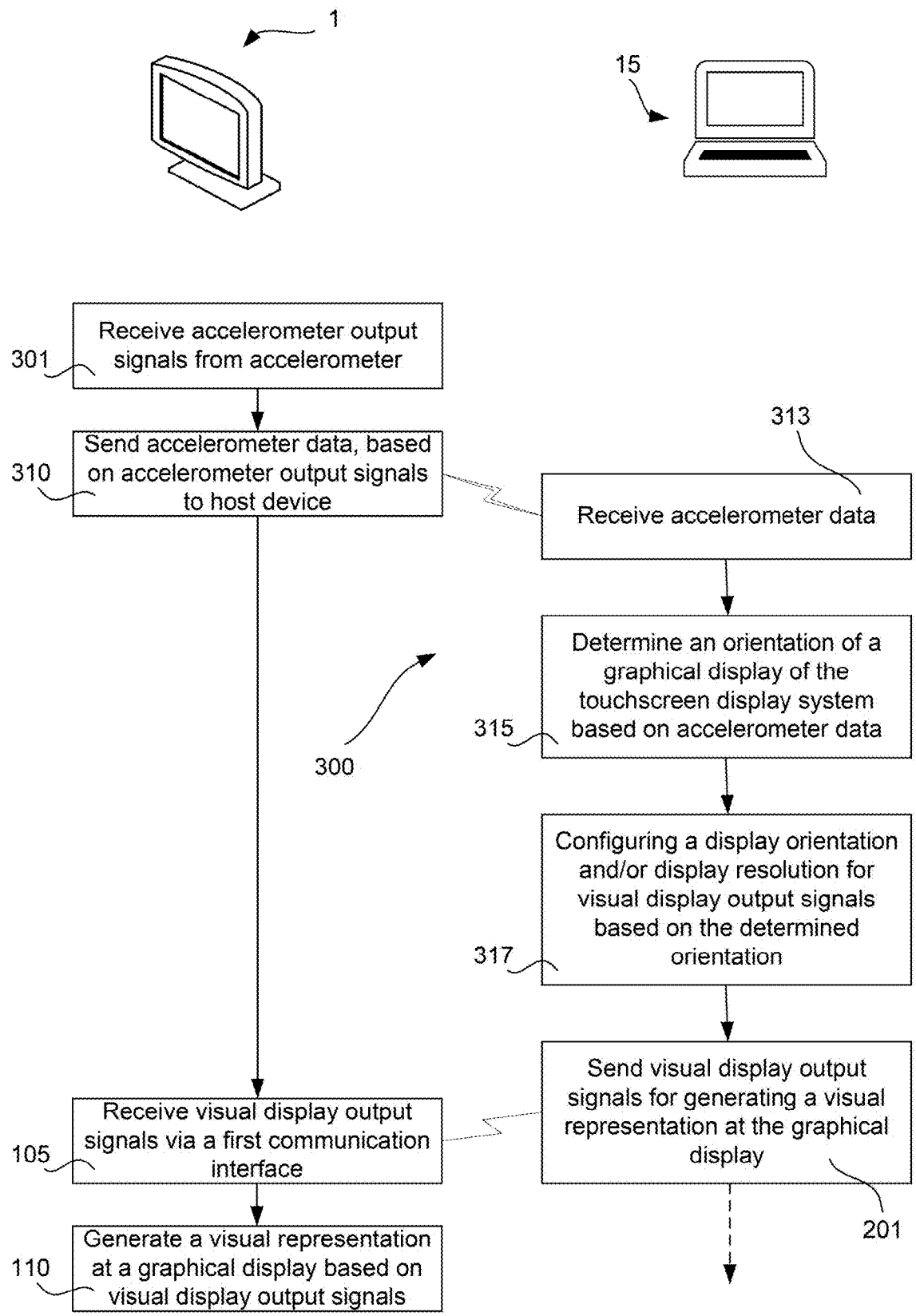
FIG. 11 illustrates a flow diagram of a method performed by the host device to configure settings based on the orientation of the touchscreen display system.
Figure 12:
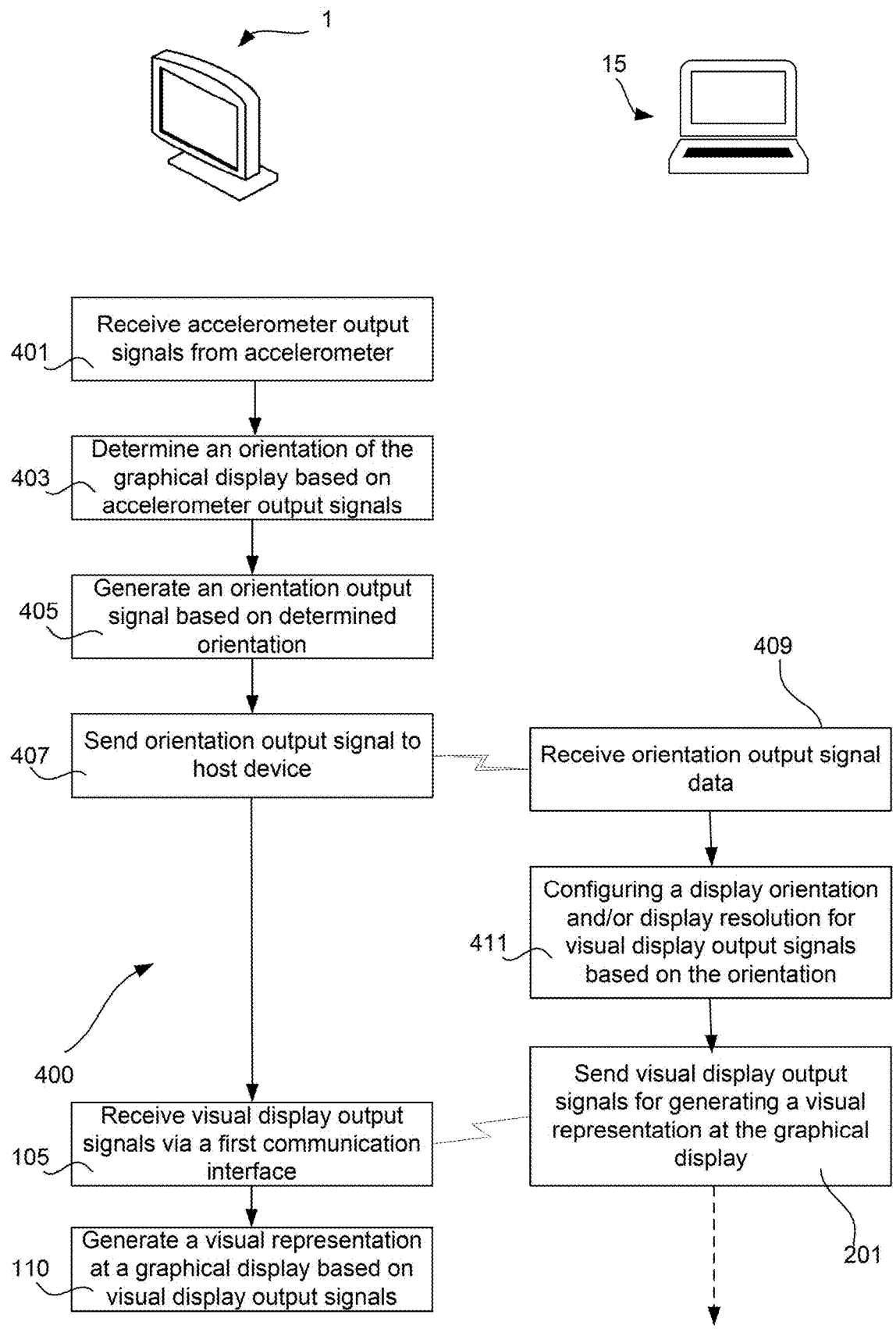
FIG. 12 illustrates a flow diagram of an alternative method to configure settings based on the orientation of the touchscreen display system.

The present disclosure also includes computer-implemented method 200, 300, 400 performed by at least one processor of the host device 15 as illustrated in FIGS. 8, 11, and 12. This computer-implemented method assists in additional functionality such as receiving and interpreting gestures, adjusting boundaries in response to orientation changes, and ensuring output and input with the touchscreen display system 1 is in an appropriate form.

Touchscreen Display System 1

The components of the touchscreen display system 1 will now be described in detail with reference to FIG. 1.

The graphical display 3 can include an active electronic display. This can include an electronic display based on liquid crystal display (LCD), light emitting diode (LED), organic light emitting diode (OLED) technology.

The graphical display 3 may output a colour visual representation based on visual display output signals. The visual display output signals may include, or be based on one or more of: DisplayPort™, Digital Video Interface (DVI), VGA, HDMI®, etc.

The graphical display 3 may be configured to use one or more display resolution and/or aspect ratios. In some examples, the graphical display 3 supports one or more of the following display resolutions:

3840×2160—4K with a typical aspect ratio of 16:9
2560×1440—QHD with a typical aspect ratio of 16:9
1920×1080—FHD with a typical aspect ratio of 16:9
1680×1050—WSXGA+ with atypical aspect ratio of 16:10

It is to be appreciated that other resolution and aspect ratios may be supported.

In some alternative examples, the graphical display 3 may include a passive electronic display, for example using electronic paper (known as "e-ink") display technology.

The touchscreen display system 1 also includes a touch panel sensor 7. This can be adjacent to, or integrated with, the graphical display 3. The touch panel sensor 7 is configured to detect a touch input 9 of a user 10, such as contact of a digit or stylus with the touchscreen display system. In some examples, this can include a capacitive touch panel sensor that measures change in capacitance upon contact of a user's digit(s) or stylus with the touchscreen display system 1 to provide touch data input signals. In alternative examples, this can include a resistive touchscreen that detects changes in pressure on a surface of the touchscreen display system 1, such as pressure applied by a digit or stylus against the touchscreen display system. The change in pressure results in differences in detected voltage to provide touch data input signals.

Figure 3:
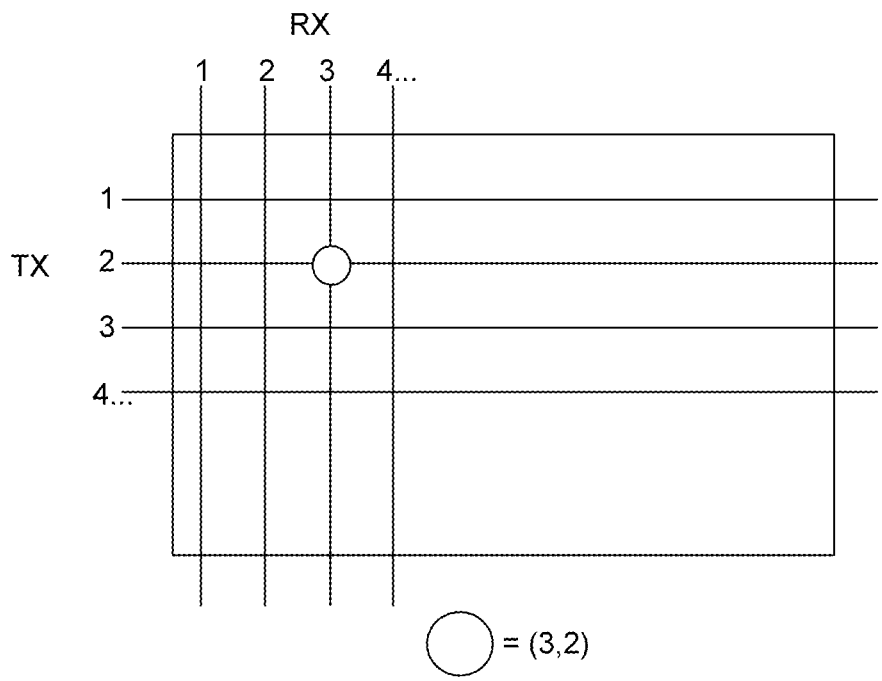
FIG. 3 is a representation of touch inputs on a plane of the touch panel sensor.
Figure 4:
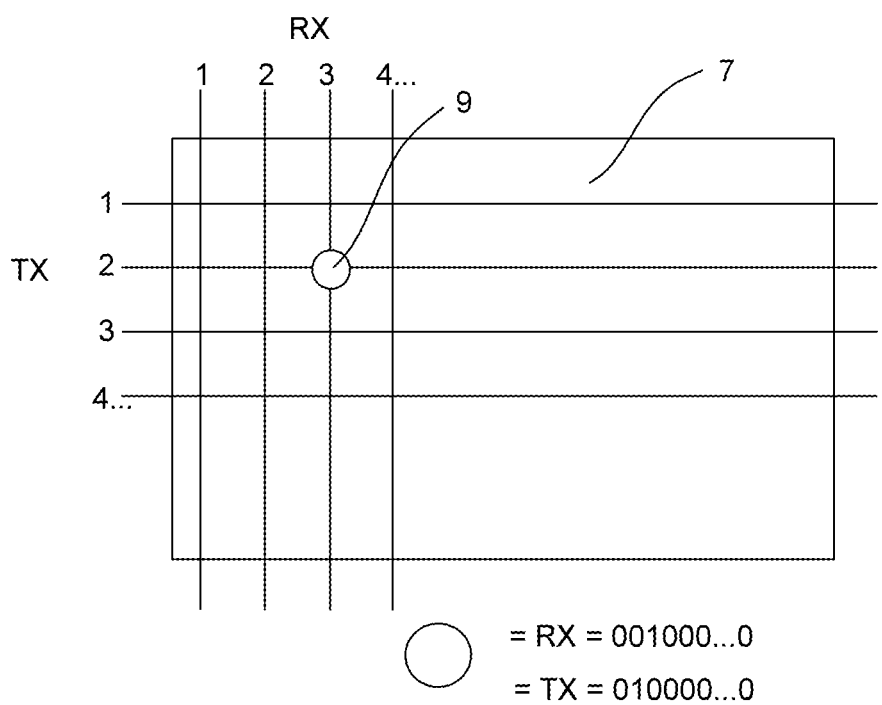
FIG. 4 is the representation of touch inputs of FIG. 3 and the corresponding binary value.

FIGS. 3 and 4 illustrate an example of a touch input 9 at a capacitive touch panel sensor 7 of the touchscreen display system 1. The touch panel has TX channels and RX channels to receive touch inputs. The TX channels read touch inputs along a horizontal lines (to give Y axis positions when the display in the orientation shown in FIGS. 3 and 4). The RX channels read touch inputs along vertical lines (to give corresponding and perpendicular X axis positions). In some specific examples, the touch panel sensor has 44 TX channels and 72 RX channels.

When the touch panel sensor 7 detects a touch input 9 from the user 10, the touch panel sensor 7 recognises said touch as an electrical (capacitive) signal(s), to generate touch data input signals 12. The touch data input signals 12 is categorised (by the touch controller, such as processor 16) as a reference along the RX (X) and TX (Y) plane as illustrated in FIG. 3. The touch data processor 16 then assigns the RX (X)/TX (Y) reference a binary value for example 001000 as illustrated in FIG. 4. This binary value functions as raw data value(s). This will be described in further detail in the method below.

The one or more processor(s) 16, 20 of the touchscreen display system 1 are configured to perform one or more processing operations described herein. This can include touch controller 16 functions to receive, interpret, and transform the touch data input signals. This can also include display controller 20 functions to control operation of the graphical display 3. This can also include a main controller 20 to coordinate and control functions of the components of the touchscreen display system 1. In some examples, the one or more processor(s) 16 is part or a microcontroller (or microcontroller unit) that includes a processor, memory, input, and output. In other examples, the one or more processor(s) 16 is part of a system on a chip.

The first communication interface 11 communicates with the host device 15 to receive visual display output signals 13 from the host device. In some examples, the first communication interface 11 communicates with the host device 15 wirelessly through wireless communication protocols, such as WiFi®. That is, the first communication interface is, or communicates via, a WiFi® transceiver. In other examples, the first communication interface 11 communicates with the host device 15 via wired communication, such as via USB-C®, HDMI®, DisplayPort™, DVI, and variants thereof, etc. In some examples, the visual display output signals 13 received from the host device 15 are stored in a memory buffer and/or otherwise processed by a processor 16 of the touchscreen display system, before transmission to the graphical display 3 to produce the visual representation 5.

The second communication interface 17 communicates with the host device 15 to send pointing device input signals 19 to the host device 15. In some examples, this includes sending pointing device input signals 19 in accordance with a human interface device protocol. This can include those of a USB human interface device and/or Bluetooth® mouse. In some examples, this includes wireless communication via the Bluetooth® standard and the second communication interface 17 is, or communicates via, a Bluetooth® transceiver.

In alternative examples, the second communication interface 17 may communicate wirelessly to a USB receiver/dongle that is physically connected to the host device 15. From the host device 15 perspective, the pointing device input signals 19 emulates a mouse physically connected to the host device 15 by USB. In yet further examples, the second communication interface 17 and the host device 15 are physically connected (such as a cable in accordance with one of the USB standards).

The touchscreen display system 1 may also include one or more accelerometers 31 to provide accelerometer output signals 53. This is used to determine the orientation of the touchscreen display system 1 and to assist in transition between landscape and portrait orientations. In some examples, the accelerometer output signals 53 are transmitted to the host device 15 via the first communication interface 11 and/or the second communication interface 17. In other examples, the one or more processors 16 determines 403 the orientation of the touchscreen display system 1 and sends the determined orientation to the host device 15. In some examples, the determined orientation can include rotations from 0 degrees, 90 degrees, 180 degrees, and 270 degrees relative to an initial reference orientation, or an indication of portrait versus landscape orientation.

Host Device 15

Referring to FIG. 1, the host device 15 can include a desktop computer, laptop computer, tablet computer, smartphone, or other electronic device. The host device 15 is communicatively coupled to the touchscreen display system 1, whereby the touchscreen display system 1 functions as a peripheral device.

The host device 15 includes at least one processor 61, memory, and data storage to perform computer-implemented methods. The at least one processor 61 performs machine-readable instructions from the memory, or data storage, that can include instructions from an operating system and computer applications. This can include a device driver, or other software, for the touchscreen display system 1.

The host device 15 may include an alternate graphical display 34 provide another visual representation 38 (which in FIG. 2 is illustrated as the integral graphical display 36 of a laptop computer).

The host device 15 also includes a video signal controller 63 that can be performed by part of a Graphics Processing Unit (GPU) or functionally performed by the one or more processors 61. The video signals controller 63 generates visual display output signals 13 to be communicated to the touchscreen display system 1. This can include encoding video display signals to the formats and resolution noted above.

The host device 15 also includes a communication interface to transmit the visual display output signals 13. In this example, a WiFi® transceiver 65 sends the visual display output signals 13 from the host device 15 to the first communication interface 11 of the touchscreen display system 1. It is to be appreciated that in alternative examples, the visual display output signals 13 can be transmitted from the host device 15 via other means such as HDMI®, DisplayPort™, DVI connectors, etc.

The host device 15 also includes another communication interface to receive pointing device input signals 19 from the second communication interface 17 of the touchscreen display system 1. In this example, this other communication interface is in the form of a Bluetooth® transceiver 67 that receives the pointing device input signals 19 for the human interface device (HID) controller 69. The HID controller 69 may be a separate physical microcontroller, or functionally performed by the one or more processors 61 to process the pointing device input signals 19 for the operating system, device driver or other software, at the host device 3.

Software

The computer-implemented methods 100, 200, 300, 400 described below are performed by the processors 16, 61. These include machine-readable instructions stored in memory associated with the touchscreen display system 1 or the host device 15. In some examples, these machine-readable instructions are stored in computer-readable media such as random access memory (RAM), other non-transitory computer-readable medium, read only memory (ROM), and other data storage medium.

In some examples, the touchscreen display system 1 includes memory to store software instructions for the processor 16 to perform the method 100 at the touchscreen display system 1. Furthermore, software instruction for the processor 61 is stored at the host device 15 to perform the method 200, 300 at the host device. The methods will now be described below with reference to FIGS. 5 to 12.

Method 100 of displaying a visual representation and receiving touch input at a touchscreen display system 1

FIG. 5 illustrates a non-limiting example method 100 for displaying a visual representation and receiving a touch input that includes wireless communication between the host device 15 and touchscreen display 1.

A first communication channel is established between the host device 15 and the touchscreen display system 1 for the visual display output signals 13. This can include the WiFi® transceiver 65 communicating with the first communication interface 11 and establishing communication protocols for the visual display output signals 13.

The video signal controller 63 generates visual display output signals that can be a screen mirror of the visual representation at the graphical display 34 of the host device 15, a screen extension, or a standalone window. This visual display output signals is converted at the host device 15 into a WiFi® data package that is sent 201 to the touchscreen display system 1 as illustrated in FIG. 5.

The touchscreen display system 1 receives 105 the WiFi® package to generate 110 a visual representation at the graphical display 3 based on the visual display output signals 13. In some particular examples, this includes the first communication interface 11 receiving the WiFi® package and temporarily storing the WiFi® package in a memory of the touchscreen display system 1. At least one processor 20 of the display controller, which may include a video signal decoder and a display control chip, processes the WiFi® package to for the graphical display 3. This can include the converting the WiFi® package to a readable form with the visual signal decoder to obtain the visual display output signals. In some examples, the converted visual display output signals 13 are temporarily stored in a memory of the touchscreen display system 1. The visual display output signals 13 may be continuously sent to the display control chip after which, they are transmitted to the graphical display 3 to generate 110 the visual representation. In some examples, the display control chip may modify the visual display outputs signals such that they are in an appropriate form for the graphical display 3.

The interaction of the user 10 with the touchscreen display system 1 will now be described. When the user 10 provides a touch input 9, which is typically touching the graphical display 3 (or near the graphical display 3) where the visual representation 3 is generated. The touch panel sensor 7 receives 113 the touch input 9 and in response, generates 115 touch data input signals 12. In some examples, the touch data input signals 12 may include raw sensor data (such as sensor data indicative of capacitance) from the touch panel sensor 7.

The method 100 includes a processor 16, such as the touch controller, determining 120, based on the touch data input signals 12, one or more locations of the touch input 9 relative to the graphical display 3. This can may include assigning the RX (X)/TX (Y) reference and/or binary values as illustrated in FIG. 4.

The touch controller 16 translates the binary value into a coordinates package which acts as a coordinate. The coordinates package is indicative of one or more locations of the touch input 9 relative to the graphical display 3. The coordinates package is derived from the binary value and from which channel it is being read from. This package provides the channel ID and the coordinates from said channel. The touch controller 16 converts this coordinate package into another data package which can be read by other constituents of the architecture. In some examples, this include the touch controller 16 generating 130 pointing device input signals based on the location of the touch input. In other examples, this can include multiple locations of the touch input so that can be output to the host device 15 to be interpreted for gesture control.

The method 100 also includes creating a Bluetooth® data package, containing the pointing device input signals, for the second communication interface 17. This data package is provided to the second communication interface 17, which in this example is a Bluetooth® transceiver chip. The chip will wrap the data package, prepare, and send 135 the data package to the host device 15. The package may be wrapped with additional information including the Bluetooth® communication protocol and HID protocol.

The host device 15 receives 235 the data package with the Bluetooth® transceiver 67, whereby the data package is sent to the HID controller 69. In some examples the Bluetooth® transceiver 67 converts the data package to be in a readable form for the HID controller 69.

The HID controller 69, on receiving the pointing device input signals 19, uses these signals for the host device operating system as a HID device. This can include sending HID control signals to the processor 61. In some examples, the HID control signals may be used by the operating system, device driver, or other software on the host device 15. This can include methods 200, 300 performed at the host device 15 detailed in further examples below.

The advantage of the method 100 is that the touchscreen display system 1 can be used with the host device 15 and associated operating system without native touchscreen support of the operating system. This can be achieved with using existing channels that are supported by the operating system, such as one channel for video and another separate channel for the pointing device.

Additional features of the method 100, 200, 300 and system 1 will now be described.

Method of Scaling or Mapping and User Interaction

In some examples, the step of generating 130 pointing device input signals 19 further includes scaling, or mapping, the one or more locations 14 of the touch input to corresponding locations 18 at the generated visual representation 5.

This may be important to calibrate or compensate for variations between a location 18 that the user visually perceives at the graphical display 3 compared to a location 14 that the person perceives their touch input 9. In some examples, this can be due to parallax if a user 10 normally views the touchscreen at a different (non-perpendicular) angle. In other examples, this may be due to changing the resolution or aspect ratio of the visual representation that requires a corresponding change with the pointing device input signals 19 to match that change. In yet other examples, the scaling or mapping is to compensate for minor manufacturing variations that result in such deviations.

In some examples, a calibration mode may invite a user 10 to touch points of the touchscreen display system 1 at various locations 18 of the visual representation 5. The calibration mode then receives touch inputs 9 and the corresponding location 16 sensed by the touch panel sensor 7. This can be used to generate a map, or parameter values for scaling, to ensure pointing device input signal 19 are generated a locations desired by the user 10. In some example, the map or parameter values are stored in the memory of the touchscreen display system 1.

The user input may be interpreted in a number of ways. In some examples, the user input 9 generates a pointing device input signal 19 that includes at least a cursor location 21. That is, a user touching a location at the visual representation 5 at the graphical display 3 will result in placing a cursor at that location 18 of the visual representation 5. This will be similar to placing a mouse cursor at the location 21 as illustrated in FIG. 2.

In some examples the user input 9 generates additional pointing device input signals 19. For example, the pointing device input signal 19 may include one or more click inputs. This may be achieved by a user input that includes one (or multiple taps) wherein the one or more taps can be interpreted by the at least one processor 16 to generate respective pointing device input signals such as a single click, double click, etc.

Gesture Control

Figure 6:
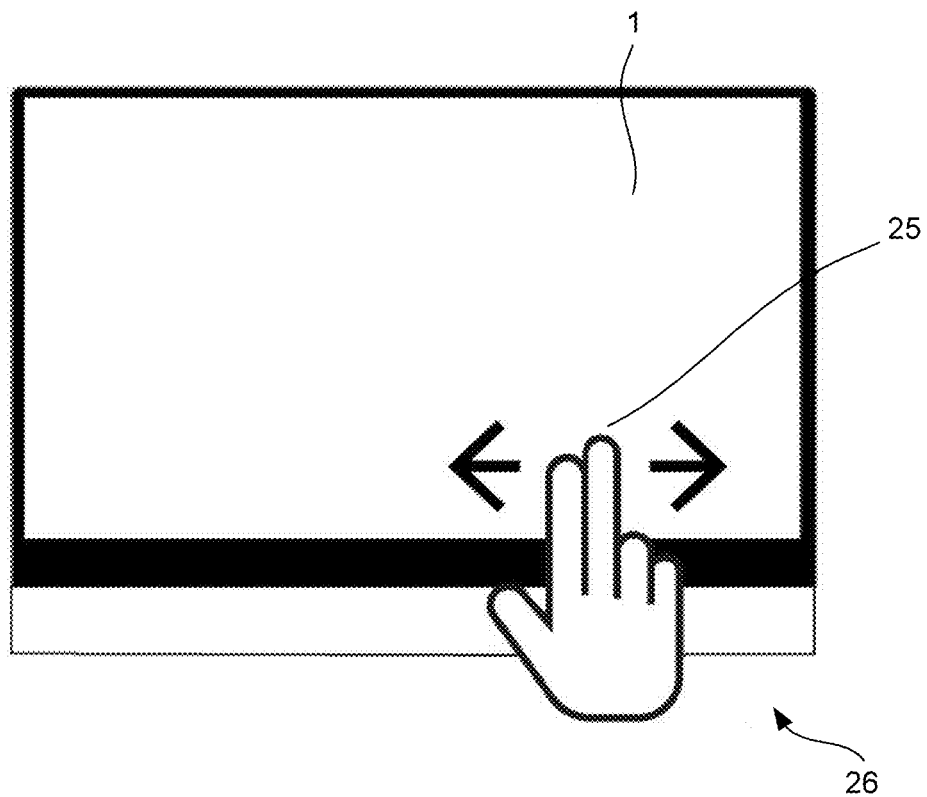
FIG. 6 illustrates an example of a gesture touch input of a user at the touchscreen display system.

In further examples, the pointing device input signal 19 includes additional signals such as gesture inputs 25. Referring to FIG. 6, gesture inputs may include multiple point touches by the user, such as two digit touch or two digit swipes (that can be used for "pinch to zoom", scrolling, changing pages, or other macros, etc.). In some examples, gesture inputs may include a single digit swipe where a user touches and moves a single digit across the screen.

In some examples, gesture inputs are interpreted by software at the host device 15. Thus the pointing device input signal 19 may include information on movement of one or multiple locations of the touch input 9 to the host device 15. It is up to the host device 15, and software thereon, to interpret such gestures.

To that end, software at the host device 15 causes the processor 61 to receive pointing device input signals 19 with one or more gesture inputs 25 and determine, based on the input pointing device input signals 19, one or more gestures 26. Such determined gestures may include pinching, swiping, multi finger swiping, multi finger rotation, etc. In some examples, the number of digits used is a relevant parameter of the gesture.

The processor 61 queries a library in the memory to determine one or more macros corresponding to the one or more gestures (26). To effect these macros, the processor 61 further executed the determined macro corresponding to the gesture. For example, if the pointing device input signals 19 indicated two fingers pinching together, this can be interpreted as a "pinch to zoom out" whereby an appropriate macro includes causing the visual representation 5 to zoom out. In further examples, pointing device input signals 19 indicating two finger moving apart may be interpreted as "zooming in" whereby an appropriate macro causes the visual representation 5 to zoom in.

In some examples, the gestures are interpreted by a driver, or other software, running on the host device 15. It is to be appreciated that in some examples, the user can configure the gestures to their personal preference.

Variation of Gesture Control

In one variation, the touchscreen display system 1 determines the user is inputting gesture inputs. In response the display system sends additional human interface device (HID) signals indicative of that gesture input. The additional HID signals may be non-pointing device signals, such as keyboard HID signals. At the host device, these additional HID signals can be interpreted by the software to perform additional tasks, including macros. A non-limiting example of this will be described below.

The at least one processor 16 of the touchscreen display system is configured to determine, based on the touch input signals, on or more gestures. For example, the may include identifying that the user input includes a three finger swipe of the screen as a gesture. In response to that determination, the processor then generates additional HID signals based the gestures. For example, the at least one processor may generates an obscure or unique HID signal. The additional HID signal may be a combination of keystrokes for a keyboard HID and an illustrative example would be "CMD+Option+Fn+4". This combination may be selected as combination that a user is unlikely to use during normal use (hence making the combination relatively obscure and unique). The method then includes sending the additional HID signal to the host device via the second communication interface (or third communication interface). In some examples, this include sending the additional signal as a Bluetooth® keyboard.

The host device 15, then receives the additional HID signals, such as via a Bluetooth® transceiver 67 and HID controller 69. The additional HID signals are then interpreted by software at the host device 15. The processor queries a library to determine or more macros corresponding to the additional HID signals. For examples, the additional HID signal "CMD+Option+Fn+4" may correspond to "Open a new document in the MS WORD application".

In some examples, the software at the host device is user configurable so that the macros can be modified for the user's preferences. This can include customisation of macros globally or customisation to the macros that are application specific. Thus in one illustrative example, the additional HID signal "CMD+Option+Fn+4" when the FIGMA application is open may correspond to "Insert new object". Thus the same gesture can provide different results depending on which application is running in the foreground.

Palm Rejection

Figure 7:
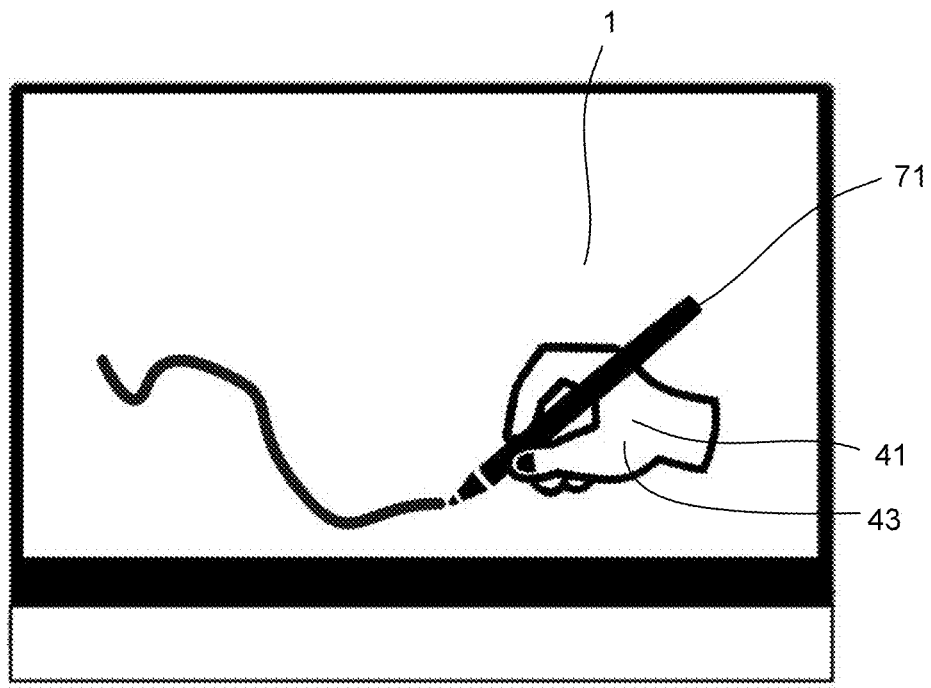
FIG. 7 illustrated an example of a user using a stylus for input to a touchscreen display system, where a palm of the user is in contact with the touchscreen display.

In some examples, it is desirable to filter or reject certain input presented to the touch panel sensor 7. Referring to FIG. 7, when a user 10 users a stylus 71, the palm of the user's 10 hand may also be sensed by the touch panel sensor 7. To reduce unnecessary signals to be transmitted to the host device 15 (and avoid latency), the touchscreen display system 1 can perform palm rejection on the device. To that end, the processor 16 of the touch panel sensor 7 is further configured to determine 140, based on the touch data input signals 12, or the one or more location of the touch input 9, a palm location 43 of the touch input 9 that correspond to palm contact 41 of a user with the touch panel sensor 7. This can involve distinguishing a single touch (corresponding to a finger or stylus) from a group touch (corresponding to a palm). This can include determining a palm location based on size and/or shape of a touch input 9 sensed by the touch panel sensor 7. For example, a user's single finger, or stylus, in contact with the touchscreen may be in the order of less than 2 square centimetres. The palm contact 41 of a user, may be in the order of greater than 5 square centimetres. Thus in one example, palm rejection may be based on rejecting contact that is a continuous area greater than a threshold value (or in a specified range).

In addition, the processor 16 is further configured to generate 130 pointing device input signals 19 based on locations of the touch input without the determined palm location 43. Therefore the pointing device input signals 19 sent to the host device 15 are clean and without the palm location. This can reduce processing and latency at the host device 15 that can, instead, use computing resources for other tasks such as gesture control.

In some examples filtering and logic operations to distinguish between group touch of a palm and a single touch is performed by a separate touch controller chip, or processor. This can include the GT7387P integrated circuit chip offered by Goodix.

Another Example of Differentiating Between Stylus and Finger

In another example, distinguishing a physical touch from a finger (or other human body part, such as a palm) in contrast with a stylus/pen can be achieved by reading respective voltage differences at the touch panel sensor 7.

Both stylus and finger produce different voltage readings when contact is made to the graphical display 3/touch panel sensor 7. In some examples, the touch panel system distinguishes a finger/digit/palm versus stylus based on the respective voltage reading. This may be performed at the touch controller/processor 16 at the touch panel system 1. In other examples, this may be performed at the host device 15.

The touch panel system 1 may create an initial reading by reading the voltage of the user and the stylus as training data. Subsequent use may refer to the training data to determine whether a stylus or finger is being used. In some examples, the touch panel sensor 7 may support 4096 levels of pressure sensitivity based on voltage. The training data may be used to set boundaries, thresholds, or patterns to enable the system to determine whether there is a stylus input versus a finger/digit input. In some example, identification of a stylus input versus a finger/digit input affects how the pointing device input signals 19 are generated 130 so that different functionality can be achieved when a user uses a stylus versus a finger/digit.

Switching Between Active Screen

An example method 200 of switching between active screens will now be described with reference to FIGS. 2 and 8. In this case, the user 10 may provide inputs via multiple means, such as by touch input 9 at the touchscreen display system and by an alternative pointing device 31 such as a mouse or trackpad connected to the host device 15. The system is configured so that there are two (or more) displays that include the graphical display 3 of the touchscreen 1 and an alternate graphical display 34. These two (or more) graphical displays may alternate to be the active screen based on where an input of a pointing device will be presented.

The user 10 may wish to switch between one, or the other graphical displays and/or switch between using touch input 9 and the alternative pointing device 31. To that end, the system can be further configured to automatically switch between these input and output means.

As an example, the user may initially be using the alternative pointing device 31 to move a cursor 33 at the visual representation 38 at alternative graphical display 34 (which in this case is actively interacting with the integral visual display of a laptop). The user 10 may then wish to interact directly by a touch input 9 on an area of the visual representation 5 in the visual representation 5 of the touchscreen display system 1. This will require a switch of the active screen.

When the user 10 is actively providing touch input 9 that is sensed at the touch panel sensor 7, the at least one processor 16 in a first mode is configured to generate 130 the pointing device input signal 19 that further includes an active screen notification. The active screen notification is indicative of an active touch input 9 of the user 10 at the touch panel sensor 7. This is also indicative that the visual representation 5 at the graphical display 3 should be the active screen. Thus when the active screen notification 27 is received at the host device 15, this enables switching 236 to a cursor location 21 to a corresponding location 18 at the generated visual representation 5.

In some examples, the method includes determining the relative position of the graphical display 3 relative to the alternate graphical display 34. In response to the active screen notification 27, the switching 236 the cursor location 21 to a corresponding location(18 at the generated visual representation 5 displayed on the graphical display 3 includes applying an offset based on the relative position of the graphical display 3. This can assist in correctly locating the cursor location 21 on the visual representation 5 at the graphical display 3.

In further examples, once the touch input 9 of the user is no longer detected at the touch panel sensor 7, the pointing device should revert back to the alternative pointing device 31. Therefore in the absence of an active touch input 9 at the touch panel sensor 7, the at least one processor 16 in a second mode is further configured to generate an inactive screen notification. In response to the inactive screen notification, the host device 15 switches back to the alternative pointing device 31 of the host device.

In one variation, instead of sending and inactive screen notification, the at least one processor 16 may be configured to stop sending the active screen notification in the pointing device input signal 19. In response to the absence of the active screen notification, the host device switches back to the alternative pointing device 31.

In one configuration, switching back to the alternative pointing device 31 includes the alternative pointing device using the last location of the cursor 21 from the touch input 9. Thus moving the alternative pointing device 31 will move cursor 21 from the last location 14 at the graphical display 3 of the touchscreen display system 1.

In an alternative configuration, switching back to the alternative pointing device 31 will revert the cursor 33 to the last location of the cursor 33 when the alternative pointing device 31 was last used. Therefore in response to receiving the inactive screen notification 29, or absence of the active screen notification, the host device 15 reverts to the preceding cursor location 33 associated with the visual representation 5, or alternative visual representation.

Rotation of Screen and Calibration and Resolution

The features of rotation of the touchscreen display system 1 between portrait and landscape, calibration and changes in resolution will now be described with reference to FIGS. 9 to 11.

Figure 9:
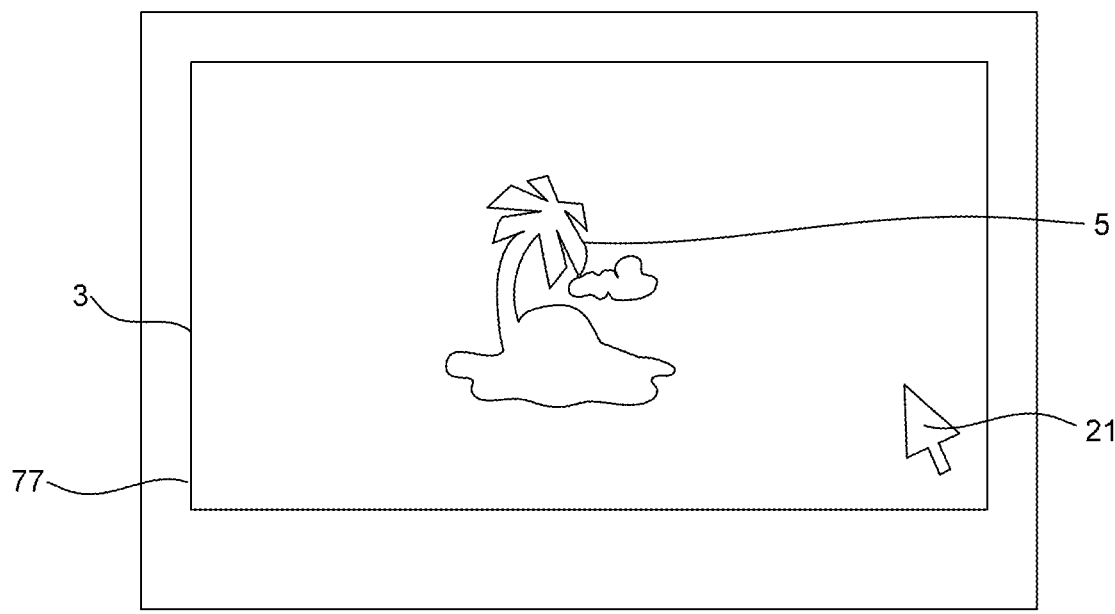
FIG. 9 illustrates an example touchscreen display system 1 in a landscape orientation.

FIG. 9 illustrates a touchscreen display 1 in the landscape orientation. In an illustrative example, this is at full high definition resolution with 1920 pixels across horizontally and 1080 pixels along vertically with a 16:9 aspect ratio.

Figure 10:
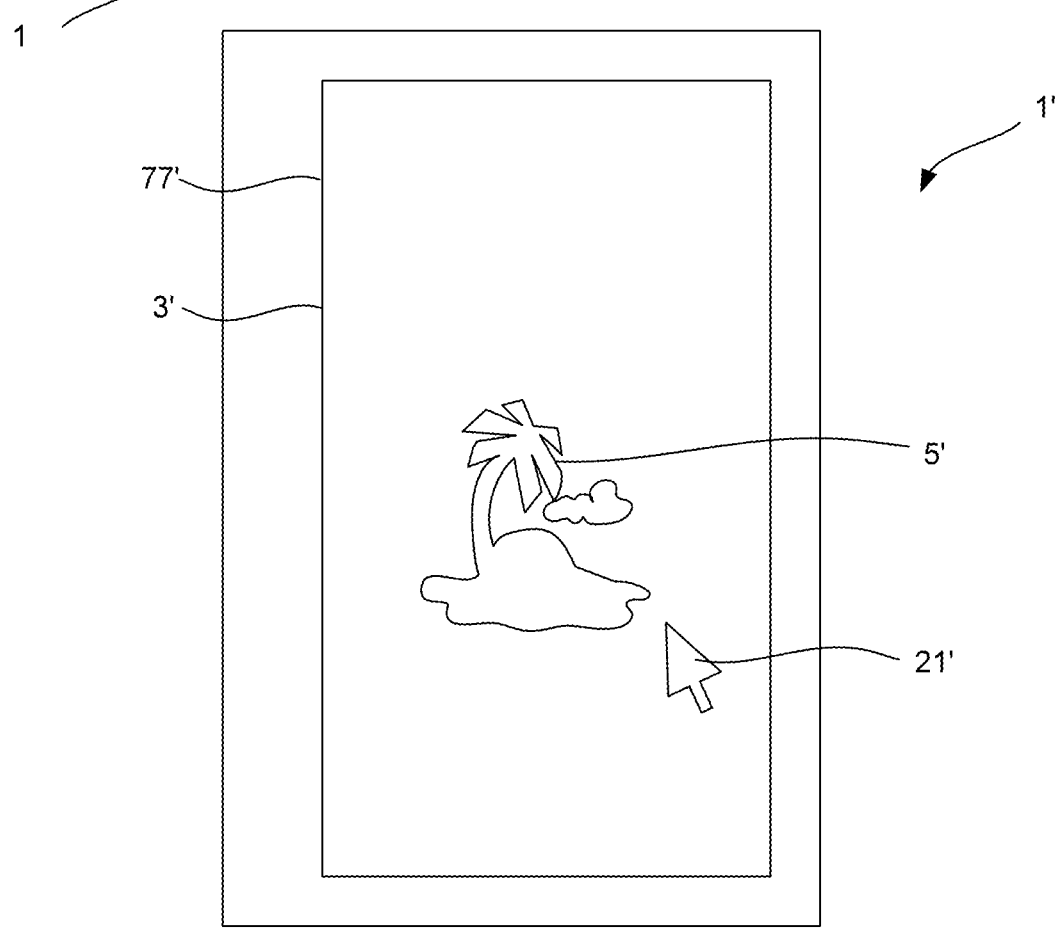
FIG. 10 illustrates the example touchscreen display system 1 in a portrait orientation.

FIG. 10 illustrates a touchscreen display 1' in the portrait orientation where it has been rotated 90 degrees clockwise. With the same full high definitions resolution this results in 1080 pixels across horizontally and 1920 pixels along vertically.

Importantly, when the touchscreen display 1 is rotated, the configuration at the host device 15 is adjusted so that the visual display output signals 13 are changed to display the visual representation 5 in the correct orientation. This is illustrated in FIGS. 9 and 10 where the visual representation of the island and palm tree 5, 5' are changed to have a correct orientation for the user. Additional configuration is required so that the touch input, and the pointing device input signals 19, are correctly interpreted.

When the touchscreen display 1 is reorientated, such as between 0, 90, 180, and 270 degrees from the landscape configuration shown in FIG. 9, this change is detected by the one or more accelerometers 51 that provide accelerometer output signals 53. These accelerometer output signals can be used to determine the orientation by the touchscreen display 1 and/or the host device 15.

An example method of determining orientation by the host device 15 will now be described with reference to FIG. 11. The accelerometer output signals are received 301 and accelerometer data is then sent 310 from touchscreen display system 1. The processor 61 at the host device 15 receives 313 the accelerometer data and then determines 315 an orientation of the graphical display of the touchscreen display system based on the accelerometer data. This can be achieved by calculating the vector that corresponds to gravity (i.e. the corresponding direction of one g on the touchscreen display system 1). The method further includes processor 61 executing software to configure 317 display settings at the host device. This can include configuring settings at the operating system (or other applications) and include running macros to change those display settings. For example, if the software determines that the graphical display has changed from landscape to portrait, this results in configuring the display orientation at the display settings of the operating system (or other applications) to the portrait mode. This can include specifying if the portrait mode is rotated the 90 degree clockwise or 90 degree anticlockwise direction from the previous landscape orientation of 0 degrees. In some examples, the software may also change resolution settings and/or aspect ratios based on the determined orientation. In response to changes to the display settings, the host device then sends 201, to the touchscreen display system, visual display output signals 13 for generating a visual representation 5 in portrait orientation at the graphical display 3.

It is to be appreciated that the method 300 may be performed multiple times so that a user can actively rotate the touchscreen display system 1 multiple times during a work session. The software performing the calibration may perform this continuously, automatically, and unobtrusively in the background to reduce disruption to the user's workflow. In one example, this may include the software checking and, if required, refreshing the orientation every second. It is to be appreciated that other refresh rates may be used, such as every 0.5 seconds, every 2 seconds, every 5 seconds, etc.

An alternative method 400 where determining orientation is initially performed at the touchscreen display system 1 will now be described with reference to FIG. 12. The accelerometer output signals are received 401 and the at least one processor 16 of the touchscreen display system 1 determines 403 an orientation of the graphical display based on the accelerometer output signals. The at least one processor 16 generates 405 an orientation output signal based on the determined orientation and sends 407 the orientation output signal to the host device 15. In some examples, the orientation output signal is transmitted via the first communication interface 11. In other examples, the orientation output signal is transmitted via the second communication interface 17. In yet further examples, the orientation output signal is transmitted via a third communication interface or means (not shown). The processor 61 at the host device 15 receives 409 the orientation output signal that is indicative of the orientation of the graphical display 3. The method further includes the processor 61 executing software to configure 411 display settings at the host device. This may be similar to configuring display settings as described in the above example of FIG. 11. This can include configuring 411 settings at the operating system (or other applications) and include running macros to change those display settings. In response to changes to the display settings, the host device then sends 201, to the touchscreen display system, visual display output signals 13 for generating a visual representation 5 in portrait orientation at the graphical display 3.

In some examples, the change in orientation also changes the configuration and/or behaviour of the pointing device input signals 19. The at least one processor 16 may be configured to generate 130 pointing device input signal 19 that is further based on the accelerometer output signals and/or the determined orientation. Referring to FIG. 9 that is in landscape mode, the touch input can correspond to 1920 pixel locations along horizontally. However in portrait mode, as illustrated in FIG. 10, the touch input can only correspond to 1080 pixel locations horizontally. Thus the pointing device input signals 19 need to be adjusted accordingly. This may include scaling or mapping the touch inputs. Similarly, the pixel locations vertically need to be adjusted.

In some examples, a corresponding reconfiguration for pointing devices is also required at the host device 15 (including host device software, drivers, or other applications). This can be particularly important where other pointing devices 31 could be used in a window of the reorientated touchscreen display system 1. For example, if a user elects to use a separate mouse or trackpad to point a cursor 21 at the visual representation at the graphical display 3. To that end, the at least one processor 61 of the host device is further configures a boundary for a pointing device based on the display orientation and/or display settings. The boundary may be based on the sides of visual representation (in the portrait or landscape mode) so that the cursor cannot move beyond at least one of the sides of the boundary. Similar to the display settings, these changes may be configured at the operating system and refreshed at, or around the same frequency, as changes to the display settings.

Multiple Touchscreen Displays

In further examples, a touchscreen display system 501 includes multiple graphical displays 3, 3' connected to the host device 15. In this example, features of the further graphical display 3' is denoted by a prime and, in general, the features are similar to those of the graphical display 3 described above. In some examples, the graphical displays 3, 3' include substantially similar or identical hardware and software.

Figure 13:
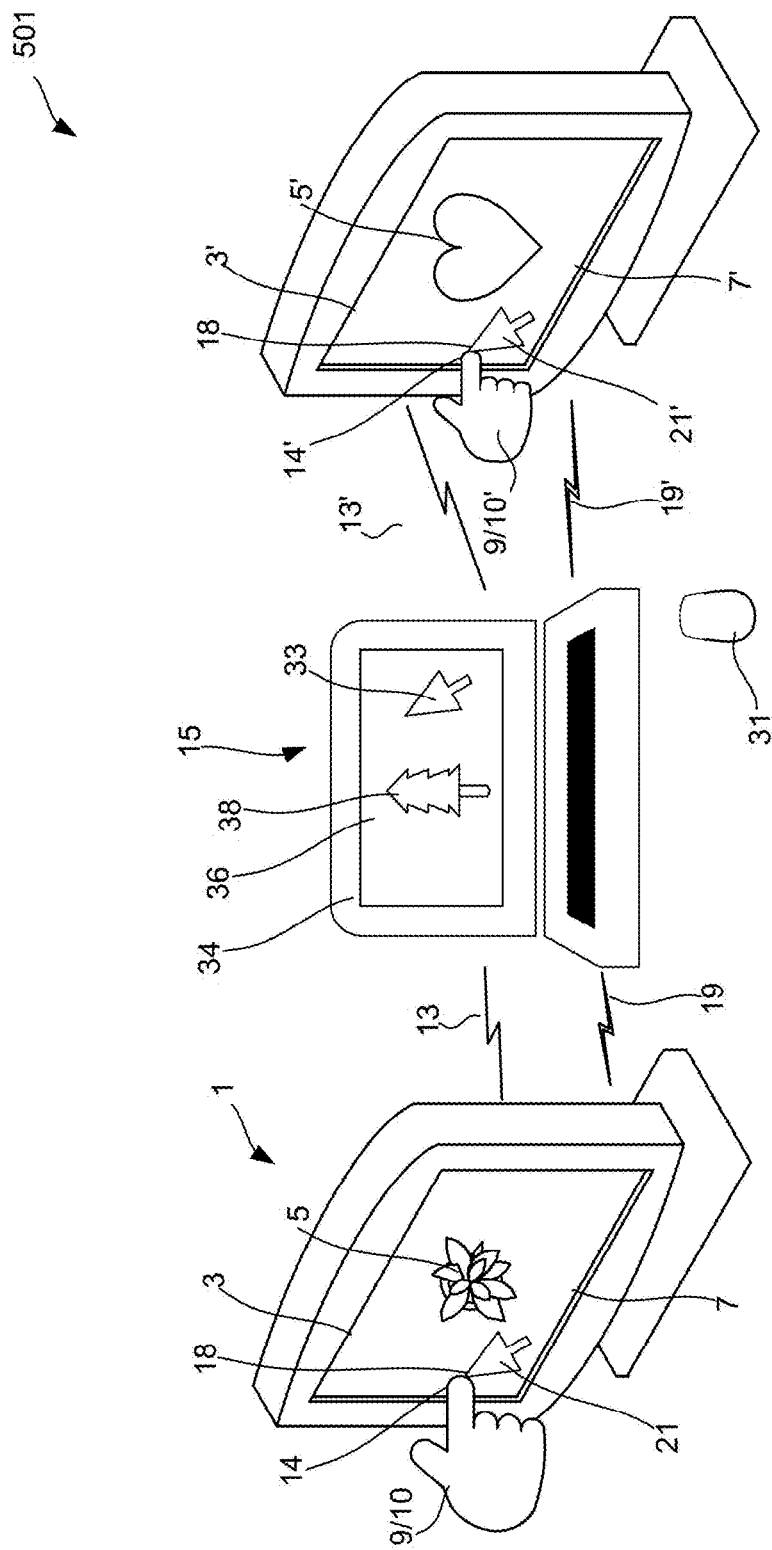
FIG. 13 illustrates an example of a touch screen display system with two graphical displays and a host device.

The use of multiple graphical displays 3, 3' may enable the user to have further screen space and, as illustrated in FIG. 13, the further graphical display 3' can display a visual representation 5' that is different to those of the first graphical display 3 or the integral graphical display 36 of the host device 15. In other examples, the further graphical display 3' may be a mirror of one or more of the first graphical display 3 or integral graphical display 36.

Thus the configuration of the touchscreen display system 501 includes multiple touchscreen graphical displays 3, 3', and the system needs to effectively interpret touch input 9, 9' of the user 10, and generate corresponding pointing device input signals 19, 19'. One issue is how to appropriately map such touch inputs to respective displays.

Each of the graphical displays 3, 3' have respective first communication interface 11, 11' and second communication interface 17, 17' with the host device 5. Thus in this example, there are four signal channels:

(i) the visual display output signal 13 from the host device 15 to the first graphical display 3;
(ii) the pointing device input signals 19 from the first graphical display 3 to the host device 15;
(iii) the visual display output signal 13' from the host device 15 to the second graphical display 3'; and
(iv) the pointing device input signals 19' from the second graphical display 3' to the host device 15.

These four channels may recognised by the host device 5 as two HID devices and two monitors.

To enable effective touchscreen operation of both touchscreen graphical displays 3, 3', the method includes identifying the pointing device input signal 19, 19' as corresponding to the first or second graphical display 3, 3', and then applying an appropriate offset to the pointing device input signal 19, 19' so that the input is interpreted correctly at the host device operating system or application. This can be performed by software at the host device 5. This will be discussed below.

When the graphical displays 3, 3' are (wirelessly, or physically) connected to the host device 5, the host device 5 specifies a port assignment corresponding to the communication channels. For example, the visual display output signal 13, communicated to the first communication interface 11 (for example, via WiFi® transceiver 65), will be provided a port assignment. This unique port assignment, which may include a name, number, of combination thereof, is used to identify the port to communicate the signal 13 with the graphical display 3. Similarly, the pointing device input signal 19 communicated from the second communication interface 17 of the first graphical display 3 (for example via BT transceiver, USB), will also be provided with a port assignment. Separate port assignments will also be provided for the second graphical display 3 and thus we can expect at least four port assignments for the system 1 illustrated in FIG. 13. In some examples, the physical connections may include USB-C® connection daisy chained to the host device (so that there are four recognised device even though there is only one physical connection to the host device).

The port assignments may be generated by the host device operating system. In some examples, these are virtual port assignments that are based on, at least in part on the serial numbers of the connected graphical displays 3, 3'. Therefore the device driver, or other software, of the touchscreen display system 1' may interrogate the input/output register to determine the port assignment names. In turn, by identifying the serial number (or other identifier) in the port assignment, the system can determine which port is associated with the respective graphical device 3, 3'. Importantly, this includes matching respective pairs of the pointing device (e.g. HID device in the input/output register) and visual display device for each touchscreen graphical display 3, 3'.

The software may also interrogate the operating system of the host device to determine the relative layout of the graphical display. In the example shown in FIG. 13, this includes a first graphical display 3 at the left hand side, the integral graphical display 36 at the centre, and a second graphical display 3' at the right hand side. It is to be appreciated that the user may specify different relative positions of the graphical displays 3, 36, 3' (for example, arranged vertically, or a mix of different relative positions). In some examples, the configuration of the displays may be adjusted with software or driver associated with the graphical display 3,3', which in turn changes the configuration with the operating system of the host device 15.

With determination of the relative layout of the graphical display 3, 3', the driver or software can determine the required offset for the pointing device input signal 19. For example, say a user 10 touches the first graphical display 3. When a pointing device input signal 19 is received at the host device 15, the software can determine, based on the correspond name of the port assignment, that the device input signal 19 is for the first graphical display 3. The software also determines that the relative location of the first graphical display 3 in the workspace of the plurality of displays, and applies an corresponding offset so that the input (such as a cursor location 21), is properly referenced to that point on the visual representation 5 on the first graphical display. In this example, this will include placing an offset to the left hand side area of the work space. If the user 10 interacts with the second graphical display 3' on the right hand side, the software will determine that the pointing device input signal 19' corresponds to the second graphical display 3'. Furthermore, the software will also determine that the second graphical display 3' is on the right hand side, and accordingly apply an offset to the right so that the cursor location 21' is at the visual representation 5' on the second graphical display 3.

The pointing device input signals 19, 19' are prioritised based on IRQ (interrupt request). This handles priorities when conflicting HID inputs are presented to the host device.

In other examples, switching between user inputs between the first and second graphical displays 3, 3' involves switching between active screens similar to the examples noted above. For example, switching to prioritise the pointing device input signals 19,19' that is indicative of the most recent change or having received the most recent touch input 9, 9' from a user 10. This, in turn, will enable selection of the respective graphical display 3, 3', 36 as the active screen and whereby the appropriate offset is applied to the prioritised input signal 19, 19'.

Figure 14:
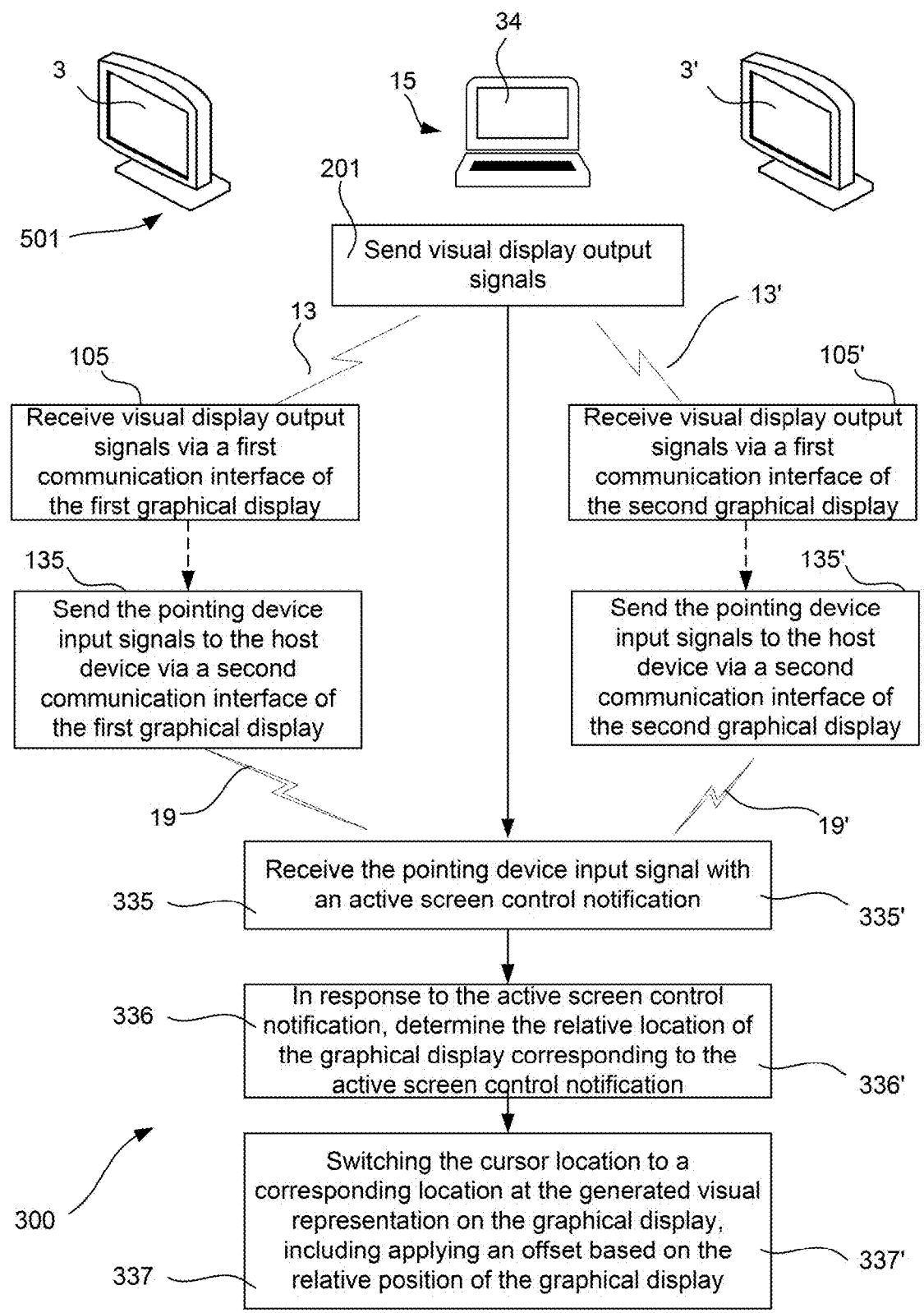
FIG. 14 illustrates a flow diagram of a method performed by the host device when operating with two graphical displays.

An example of the method 300 is illustrated in FIG. 14, where the host device 15 sends 201 to the touchscreen display system 501, first visual display output signals 13 for generating a first visual representation 5 at the first graphical display 3 and second vidual display output signals 13' for generating a second visual representation 5' at the second graphical display 3'. This can include sending on separate respective channels 13, 13'. These separate channels may be separate physical channels and/or logical channels.

When a user interacts and provides a touch or stylus input to the graphical displays, this is received and interpreted so that the touch input and cursor location can be provided at the correct display. Taking an examples where the user 10 interacts with the first graphical display 3, the method 300 includes receiving 335 a first pointing device input signal 19, wherein the first pointing device input signal 19 comprises a first active screen control notification 27 and at least a first cursor location 21. The first active screen control notification 27 is indicative of an active touch input 9 of the user at a first touch panel sensor 7 associated with the first graphical display (3). In some examples, the active screen control notification 27 may include an indication of time or time elapsed since the last change in touch input at the touch panel sensor 7.

In response to the first active screen control notification 27, the method 300 further includes determining 336 the relative location of the corresponding first graphical display 3 to the second graphical display 3' or other graphical display. The method 300 also includes switching 337 the cursor location 21 to a corresponding location 18 at the generated first visual representation 5 displayed on the first graphical display 3, wherein switching 337 to the corresponding location 18 includes applying an offset based on the relative position of the first graphical display 3.

The process when a user interacts with the second graphical display 3' is similar to the first graphical display 3 and is denoted as steps 335', 336', 337'. This includes receiving 335' a second pointing device input signal 19', wherein the second pointing device input signal 19' comprises a second active screen control notification 27' and at least a second cursor location 21'. The second active screen control notification 27' is indicative of an active touch input 9' of the user at a second touch panel sensor 7' associated with the second graphical display 3'. In response to the second active screen control notification 27', the method 300 includes determining 336 the relative location of the corresponding second graphical display 3' to the first graphical display 3 and/or other graphical display. The method also includes switching 337 the cursor location 21' to a corresponding location 18' at the generated second visual representation 5' displayed on the second graphical display 3', wherein switching 337' to the corresponding location 18 includes applying an offset based on the relative position of the second graphical display 3'.

In some examples, as noted above, the process of determining (which may include querying from the operating system) the relative location of the graphical displays to each other occurs every time and HID input (or touch device input signal) is received, or a new active screen notification is received. In other examples, this may be done periodically, based on time. In yet other examples, this may be performed as part of the start-up process of the host device.

Global Context Menu 81

When a using touchscreens, in particular using a stylus, there may be difficulties switching between functionality of touch/stylus inputs. A known computer mouse may have multiple buttons, scroll wheels, etc, that can be used to perform or access additional functionality. For example, scroll wheels can be used to scroll and/or pan across the screen, whilst movement of the mouse can be moved to point.

Figure 15:
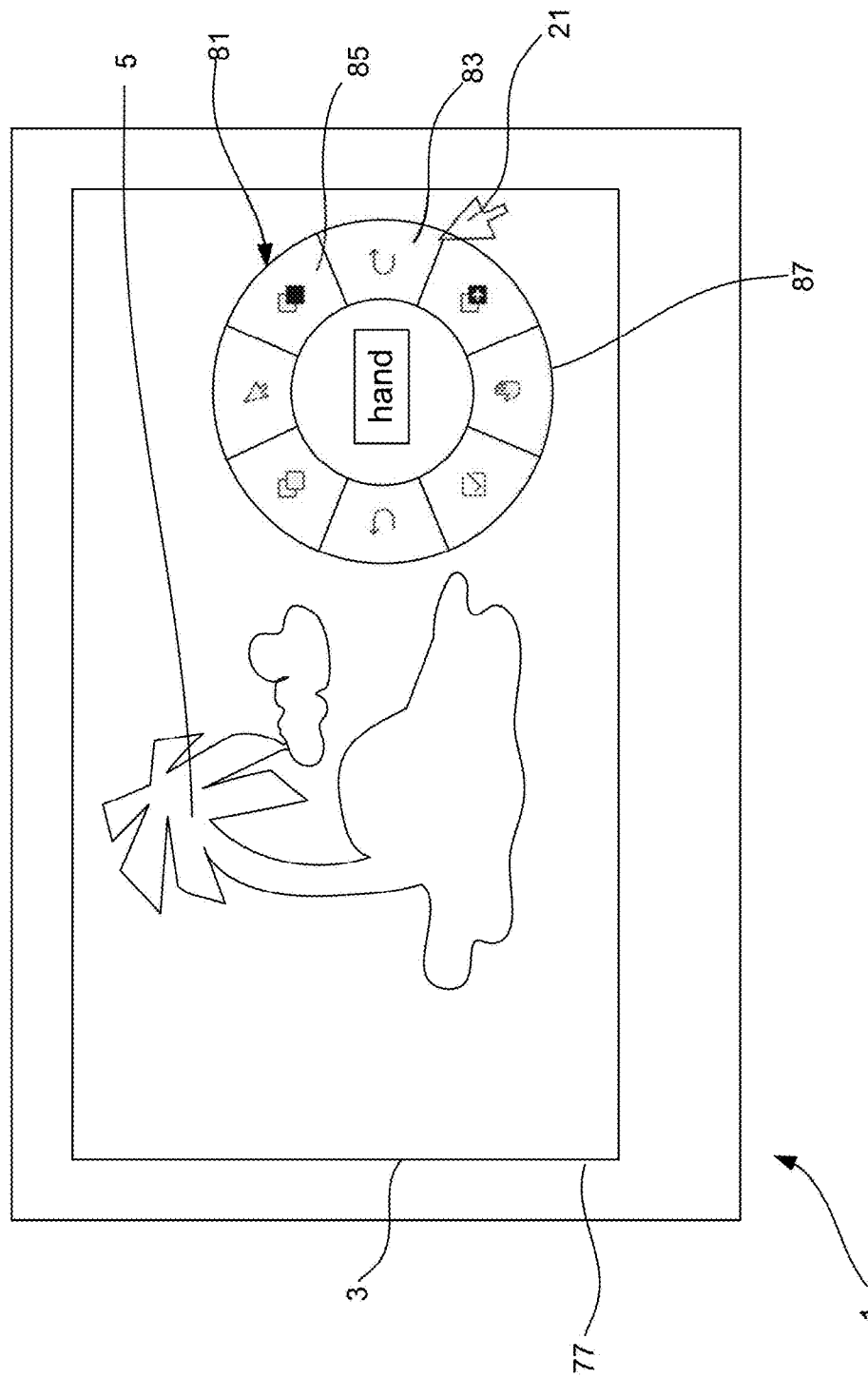
FIG. 15 illustrates an example touchscreen display with a global context menu.

FIG. 15 illustrates a global context menu 81 represented at a graphical display 3 that can be used to assist change of functionality. This global context menu 81 may be provided as an overlay over other objects displayed in the visual representation 5. In some examples, this can be application specific, whereby the global context menu 81 has selectable modes 83, 85, 87 based on the current active application. In other examples, the global context menu 81 may be operate across all applications. The global context menu enables the user to change the functionality of the stylus (or their touch input from their finger).

In one example, the stylus may have a physical button or switch input, whereby operation of that input brings forward the global context menu 8 on the graphical display. In some examples, operation of the input at the stylus in turn causes the stylus to communicate with the touchscreen system 1. The touchscreen system, in turn (such as via the second communication interface), sends a corresponding signal to the host device 15, whereby software operating at the host device 15 is configured to respond by bringing forward the global context menu 81. The user may the select items 83, 85, 87 in the global context menu that can affect how further pointing device input signals 19 are interpreted at the host device 15.

In some examples the request for the global context menu 81 is received at the touchscreen display system 1 and is sent to the host via the pointing device input signals 19. Advantageously, the stylus does not need to communicate directly with the host device 15 via another interface or channel. This can simply communication and set up between the host device 15, touchscreen display system, and the stylus. In some examples, the touchscreen display system 1 and the stylus may be configured as an integrated system so that the use does not need to set up communication (or otherwise have a complex registration process) of these two devices.

In some examples, requesting the global context menu 81 can be done with other means. In one example, the user may use keyboard shortcuts to request the global context menu 81. In other examples, the computer may voice enables functions whereby the user can vocalise a request for the global context menu, and the host device 15 responds by generating the menu 81 in the visual representation 5 that can selected by touch or stylus user inputs.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A touchscreen display system comprising:
   a graphical display to generate a visual representation;
   a first communication interface to receive visual display output signals from a host device, wherein the visual representation at the graphical display is based on the visual display output signals;
   a touch panel sensor at the graphical display to receive a touch input of a user and, in response, generate touch data input signals;
   at least one processor configured to:
     determine, based on the touch data input signals, one or more locations of the touch input relative to the graphical display; and
     generate pointing device input signals based on the one or more locations of the touch input;
     wherein the pointing device input signal further comprises, in a first mode:
       an active screen control notification, wherein the active screen control notification is indicative of an active touch input of the user at the touch panel sensor,
       wherein the active screen control notification received at the host device enables switching of a cursor location to a corresponding location at the generated visual representation,
       wherein in the absence of the active touch input at the touch panel sensor, the pointing device input signal further comprises, in a second mode:
         an inactive screen notification: or
         an absence of the active screen control notification,
     wherein in response to the inactive screen notification, or the absence of the active screen control notification received at the host device, the host device switches to an alternative pointing device of the host device,
     a second communication interface to send the pointing device input signals to the host device,
   wherein the first communication interface is separate to the second communication interface.

2. A touchscreen display system according to claim 1 wherein the pointing device input signal further comprises:
   one or more click input; and/or
   one or more gesture inputs.

3. A touchscreen display system according to claim 1, wherein the inactive screen notification, or absence of the active screen control notification, enables the host device to switch the alternative pointing device of the host device to a preceding cursor location associated with:
   the visual representation at the graphical display; or
   an alternative visual representation generated at an alternate visual display.

4. A touchscreen display system according to claim 1 wherein the at least one processor is further configured to:
   determine based on the touch data input signals, or the one or more locations of the touch input, a palm location of the touch input that correspond to palm contact of a user with the touch panel sensor,
   wherein to generate pointing device input signals is based on the one or more locations of the touch input without the determined palm location.

5. A touchscreen display system according to claim 1 further comprising:

one or more accelerometers to provide accelerometer output signals;

wherein accelerometer data, based on the accelerometer output signals, is sent to the host device, via the first communication interface and/or the second communication interface.

6. A touchscreen display system according to claim 5, wherein to generate pointing device input signals is further based on the accelerometer output signals or a determined orientation of the graphical display based on the accelerometer output signals.

7. A touchscreen display system according to claim 1, wherein the at least one processor is further configured to:
   determine, based on the touch data input signals, one or more gestures; and
   generate additional human interface device (HID) signals based on the gestures;
   wherein the second communication interface is further configured to send the additional HID signals to the host device.

8. A computer-implemented method performed by at least one processor at a host device, the method comprising:
   sending, to a touchscreen display system via a first communication interface, visual display output signals for generating a visual representation at a graphical display;
   sending, to an alternate graphical display, alternate visual display output signals for generating an alternate visual representation at the alternate graphical display;
   receiving, from an alternative pointing device of the host device, an alternative pointing device input signal, wherein the alternative pointing device input signal includes at least a preceding cursor location associated with the visual representation, or alternative visual representation;
   receiving, from a touchscreen display system via a second communication interface, a pointing device input signal, wherein the pointing device input signal comprises:
      in a first mode, an active screen control notification and at least a cursor location,
      wherein the active screen control notification is indicative of an active touch input of the user at a touch panel sensor of the touchscreen display system, and
      wherein in response to the active screen control notification, the method includes switching the cursor location to a corresponding location at the generated visual representation displayed on the graphical display.

9. A computer-implemented method according to claim 8, wherein the pointing device input signal further comprises, in a second mode:
   an inactive screen notification; or
   an absence of the active screen control notification,
   wherein in response to the inactive screen notification, or the absence of the active screen control notification, the method includes reverting to receiving alternative pointing device input signals from the alternative pointing device.

10. A computer-implemented method according to claim 9, wherein in response to the inactive screen notification, or the absence of the active screen control notification, the method further includes reverting to the preceding cursor location associated with the visual representation, or alternative visual representation.

11. A computer-implemented method according to claim 8 further comprising:
   receiving, from the touchscreen display system, additional human interface device (HID) signals;
   querying a library to determine one or more macros corresponding to the additional HID signals; and
   executing the determined one or more macros.

12. A computer-implemented method according to claim 8, further comprising:
   receiving pointing device input signals from the touchscreen display system, wherein the pointing device input signals include one or more gesture inputs;
   determining based on the pointing device input signals one or more gestures;
   querying a library to determine one or more macros corresponding to the one or more gestures; and
   executing the determined one or more macros.

13. A computer-implemented method according to claim 8, wherein the graphical display is a first touchscreen graphical display and the alternate graphical display is a second touchscreen graphical display, and wherein in response to the active screen control notification, the method includes:
   determining the relative position of the corresponding first touchscreen graphical display to the second touchscreen graphical display; and
   wherein switching to the corresponding location includes applying an offset based on the determined relative position of the first touchscreen graphical display.

14. A computer-implemented method according to claim 13, the method further comprising:
   receiving, a second pointing device input signal, wherein the second pointing device input signal comprises a second active screen control notification and at least a second cursor location, wherein the second active screen control notification is indicative of an active touch input of the user at a second touch panel sensor associated with the second touchscreen graphical display, and
   wherein in response to the second active screen control notification, the method includes:
      determining the relative position of the corresponding second touchscreen graphical display to the first touchscreen graphical display; and
      switching the cursor location to a corresponding location at the generated second visual representation displayed on the second touchscreen graphical display, wherein switching to the corresponding location includes applying an offset based on the relative position of the second touchscreen graphical display.

15. A touchscreen display system comprising:
   a graphical display to generate a visual representation;
   a first communication interface to receive visual display output signals from a host device, wherein the visual representation at the graphical display is based on the visual display output signals;
   a touch panel sensor at the graphical display to receive a touch input of a user and, in response, generate touch data input signals;
   one or more accelerometers to provide accelerometer output signals;
   at least one processor configured to:
      determine, based on the touch data input signals, one or more locations of the touch input relative to the graphical display; and
      generate pointing device input signals based on the one or more locations of the touch input;
      wherein to generate the pointing device input signals is further based on the accelerometer output signals or a determined orientation of the graphical display based on the accelerometer output signals, and wherein the pointing device input signal further comprises, in a first mode:
- an active screen control notification, wherein the active screen control notification is indicative of an active touch input of the user at the touch panel sensor,
- wherein the active screen control notification received at the host device enables switching of a cursor location to a corresponding location at the generated visual representation, and a second communication interface to send the pointing device input signals to the host device, wherein the first communication interface is separate to the second communication interface, and wherein accelerometer data, based on the accelerometer output signals, is sent to the host device, via the first communication interface and/or the second communication interface.

* * * * *